United States Patent
Sheik et al.

(10) Patent No.: US 11,805,477 B2
(45) Date of Patent: Oct. 31, 2023

(54) METHOD TO REDUCE RECOVERY TIME FROM OUT-OF-SERVICE EVENT IN DUAL RECEIVE (DR) OR DUAL SIM DUAL ACCESS (DSDA) CAPABLE USER EQUIPMENT

(71) Applicant: QUALCOMM Incorporated, San Diego, CA (US)

(72) Inventors: Ansah Ahmed Sheik, Hyderabad (IN); Sayak Saha, Hyderabad (IN); Rajeev Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/525,526

(22) Filed: Nov. 12, 2021

(65) Prior Publication Data

US 2023/0156575 A1    May 18, 2023

(51) Int. Cl.
| | |
|---|---|
| *H04W 48/16* | (2009.01) |
| *H04W 48/18* | (2009.01) |
| *H04W 48/04* | (2009.01) |
| *H04W 76/15* | (2018.01) |
| *H04W 48/14* | (2009.01) |

(52) U.S. Cl.
CPC ........... *H04W 48/16* (2013.01); *H04W 48/14* (2013.01); *H04W 48/18* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2007/0004405 A1* | 1/2007 | Buckley | H04B 7/18547 455/434 |
| 2015/0296364 A1* | 10/2015 | Peruru | H04W 88/06 455/434 |
| 2016/0345245 A1* | 11/2016 | Chuttani | H04W 52/0225 |
| 2017/0127217 A1* | 5/2017 | Miao | H04W 76/15 |
| 2017/0303235 A1* | 10/2017 | Deogun | H04W 68/02 |
| 2023/0042896 A1* | 2/2023 | Lee | H04W 72/23 |

* cited by examiner

*Primary Examiner* — German Viana Di Prisco
(74) *Attorney, Agent, or Firm* — Loza & Loza LLP

(57) ABSTRACT

A method of wireless communication at a user equipment (UE), including: generating a first set of frequencies to search for signals from at least one candidate cell from which the UE may receive wireless service with respect to a first subscriber identity module (SIM); generating a second set of frequencies to search for signals from the at least one candidate cell from which the UE may receive wireless service with respect to the first SIM; scanning for one or more signals from the at least one candidate cell including tuning a first transceiver configured to operate in accordance with the first SIM to one or more of the first set frequencies; and scanning for one or more signals from the at least one candidate cell including tuning a second transceiver configured to operate in accordance with a second SIM to one or more of the second set of frequencies.

26 Claims, 17 Drawing Sheets

| PAGING OCCASION | CELL MEAS | SEARCH FOR CELLS ON BEHALF OF SIM-1 (OTHERWISE SLEEP TIME) | PAGING OCCASION | CELL MEAS |

→ TIME

| DECODE PDDCH AND/OR PDSCH | SEARCH FOR CELLS ON BEHALF OF SIM-1 (OTHERWISE SLEEP TIME) | DECODE PDDCH AND/OR PDSCH |

→ TIME

METHOD TO REDUCE RECOVERY TIME FROM OUT-OF-SERVICE EVENT IN DUAL RECEIVE (DR) OR DUAL SIM DUAL ACCESS (DSDA) CAPABLE USER EQUIPMENT

TECHNICAL FIELD

The technology discussed below relates generally to wireless communication networks, and more particularly, to a method to reduce recovery time from an out-of-service event in Dual Receive (DR) or Dual Sim Dual Access (DSDA) capable user equipment (UE).

INTRODUCTION

A user equipment (UE) may include a plurality of subscriber identity modules (SIMs) to communicate with different and/or the same wireless communication networks pursuant to different services specified in the SIMs, respectively. Generally, the operation of the UE under the control of the plurality of SIMs have been independent with some exception that certain hardware is shared among the operations associated with the different SIMs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An aspect of the disclosure relates to a method of wireless communication at a user equipment (UE) is disclosed. The method includes generating a first set of frequencies to scan for signals from at least one candidate cell from which the UE may receive wireless service with respect to a first subscriber identity module (SIM); generating a second set of frequencies to scan for signals from the at least one candidate cell from which the UE may receive wireless service with respect to the first SIM; scanning for one or more signals from the at least one candidate cell including tuning a first transceiver configured to operate in accordance with the first SIM to one or more of the first set of frequencies; and scanning for one or more signals from the at least one candidate cell including tuning a second transceiver configured to operate in accordance with a second SIM to one or more of the second set of frequencies.

Another aspect of the disclosure relates to a user equipment (UE) including a first transceiver; a second transceiver; a memory; and a processor communicatively coupled to the first and second transceivers and the memory, wherein the processor and the memory are configured to: generate a first set of frequencies to scan for signals from at least one candidate cell from which the UE may receive wireless service with respect to a first subscriber identity module (SIM); generate a second set of frequencies to scan for signals from the at least one candidate cell from which the UE may receive wireless service with respect to the first SIM; scan for one or more signals from the at least one candidate cell including tuning the first transceiver configured to operate in accordance with the first SIM to one or more of the first set of frequencies; and scan for one or more signals from the at least one candidate cell including tuning the second transceiver configured to operate in accordance with a second SIM to one or more of the second set of frequencies.

Another aspect of the disclosure relates to a user equipment (UE) including means for generating a first set of frequencies to scan for signals from at least one candidate cell from which the UE may receive wireless service with respect to a first subscriber identity module (SIM); means for generating a second set of frequencies to scan for signals from the at least one candidate cell from which the UE may receive wireless service with respect to the first SIM; means for scanning for one or more signals from the at least one candidate cell including tuning a first transceiver configured to operate in accordance with the first SIM to one or more of the first set of frequencies; and means for scanning for one or more signals from the at least one candidate cell including tuning a second transceiver configured to operate in accordance with a second SIM to one or more of the second set of frequencies.

Another aspect of the disclosure relates to a non-transitory computer-readable medium storing computer-executable code, comprising code for causing a computer in a user equipment (UE) to: generate a first set of frequencies to scan for signals from at least one candidate cell from which the UE may receive wireless service with respect to a first subscriber identity module (SIM); generate a second set of frequencies to scan for signals from the at least one candidate cell from which the UE may receive wireless service with respect to the first SIM; scan for one or more signals from the at least one candidate cell including tuning a first transceiver configured to operate in accordance with the first SIM to one or more of the first set of frequencies; and scan for one or more signals from the at least one candidate cell including tuning a second transceiver configured to operate in accordance with a second SIM to one or more of the second set of frequencies.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
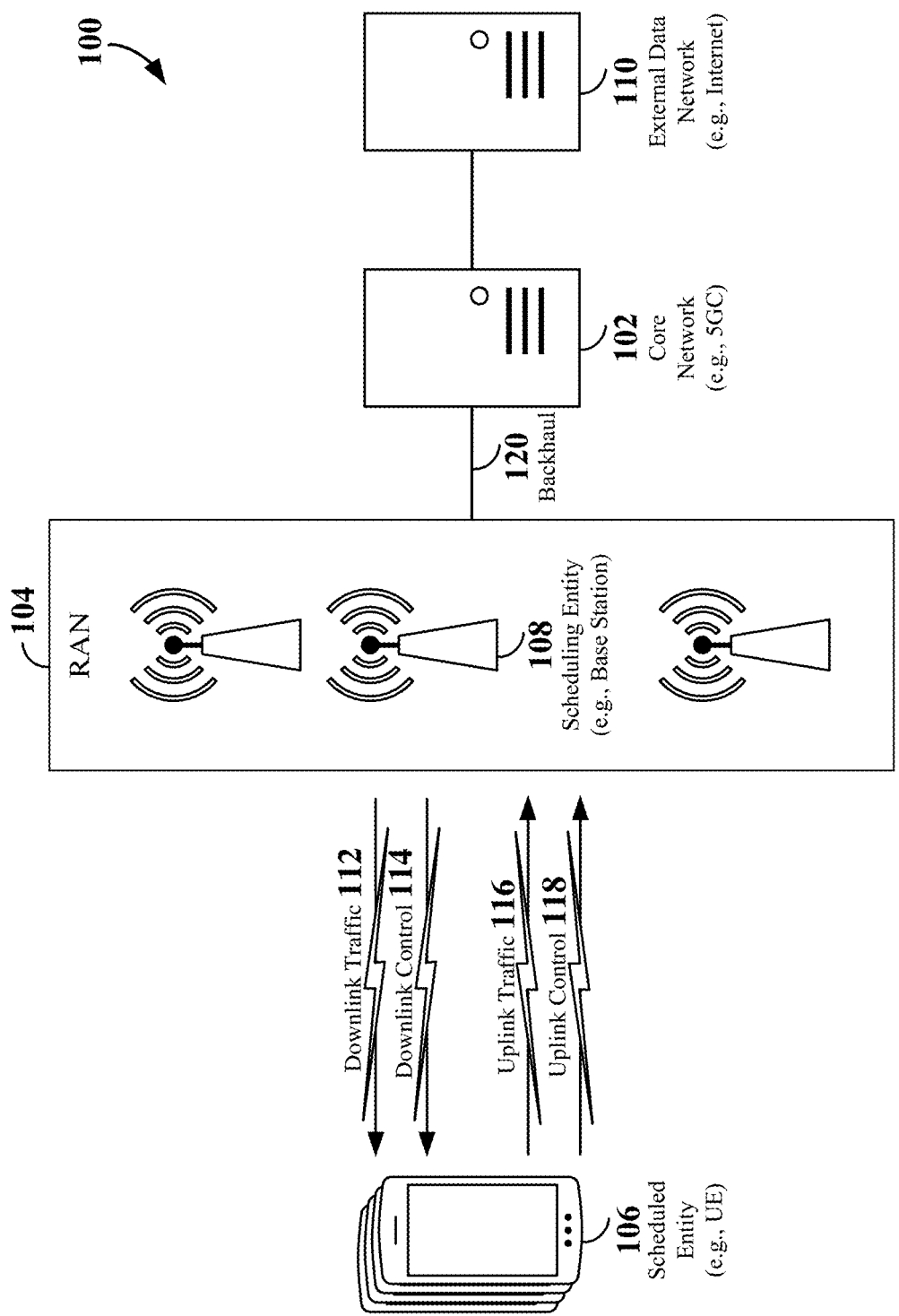
FIG. 1 is a schematic illustration of a wireless communication system in accordance with an aspect of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays. RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support. i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
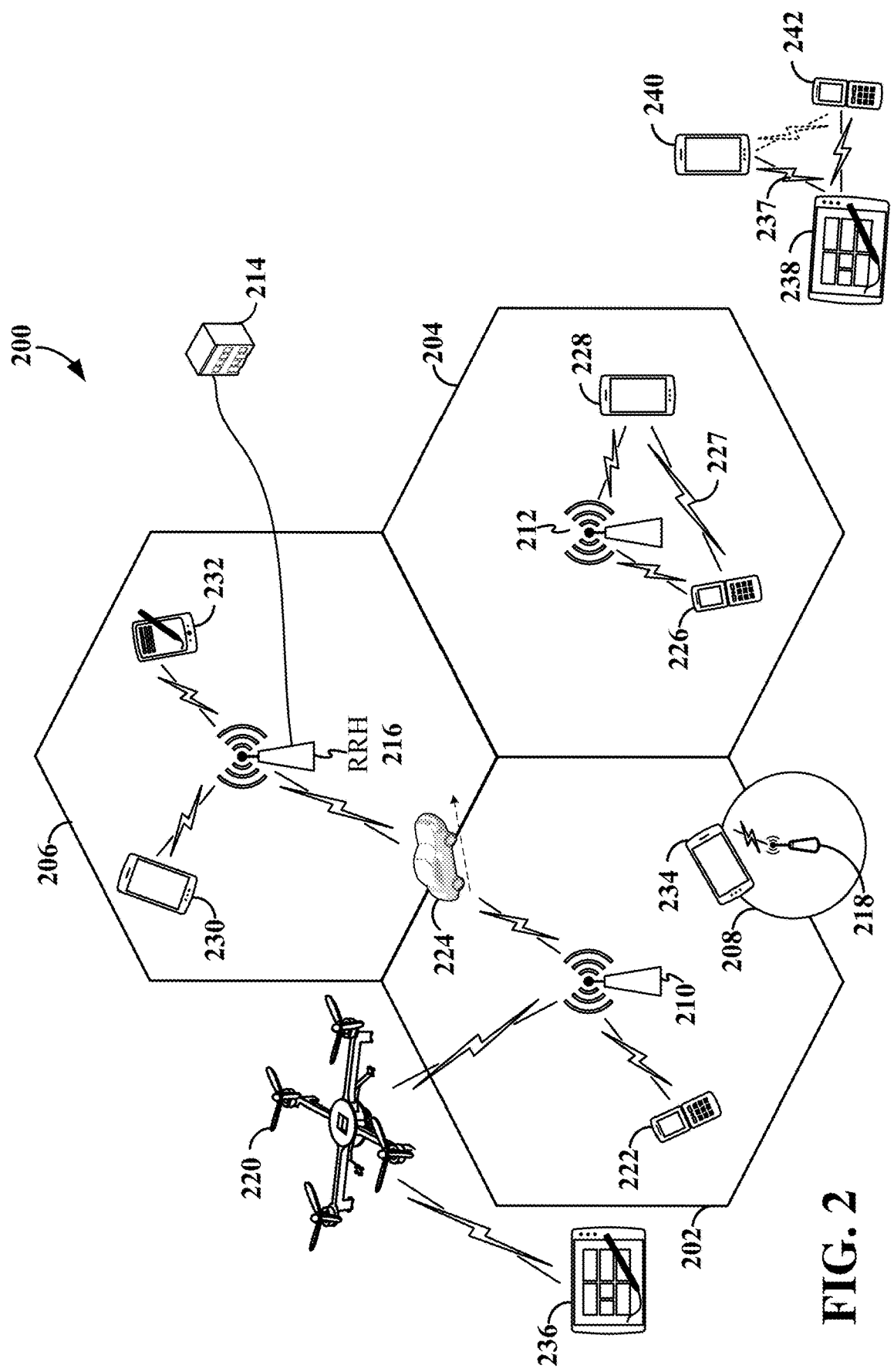
FIG. 2 is a conceptual illustration of an example of a radio access network in accordance with another aspect of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties. e.g., with suitable licensee-determined conditions to gain access.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at sometimes the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
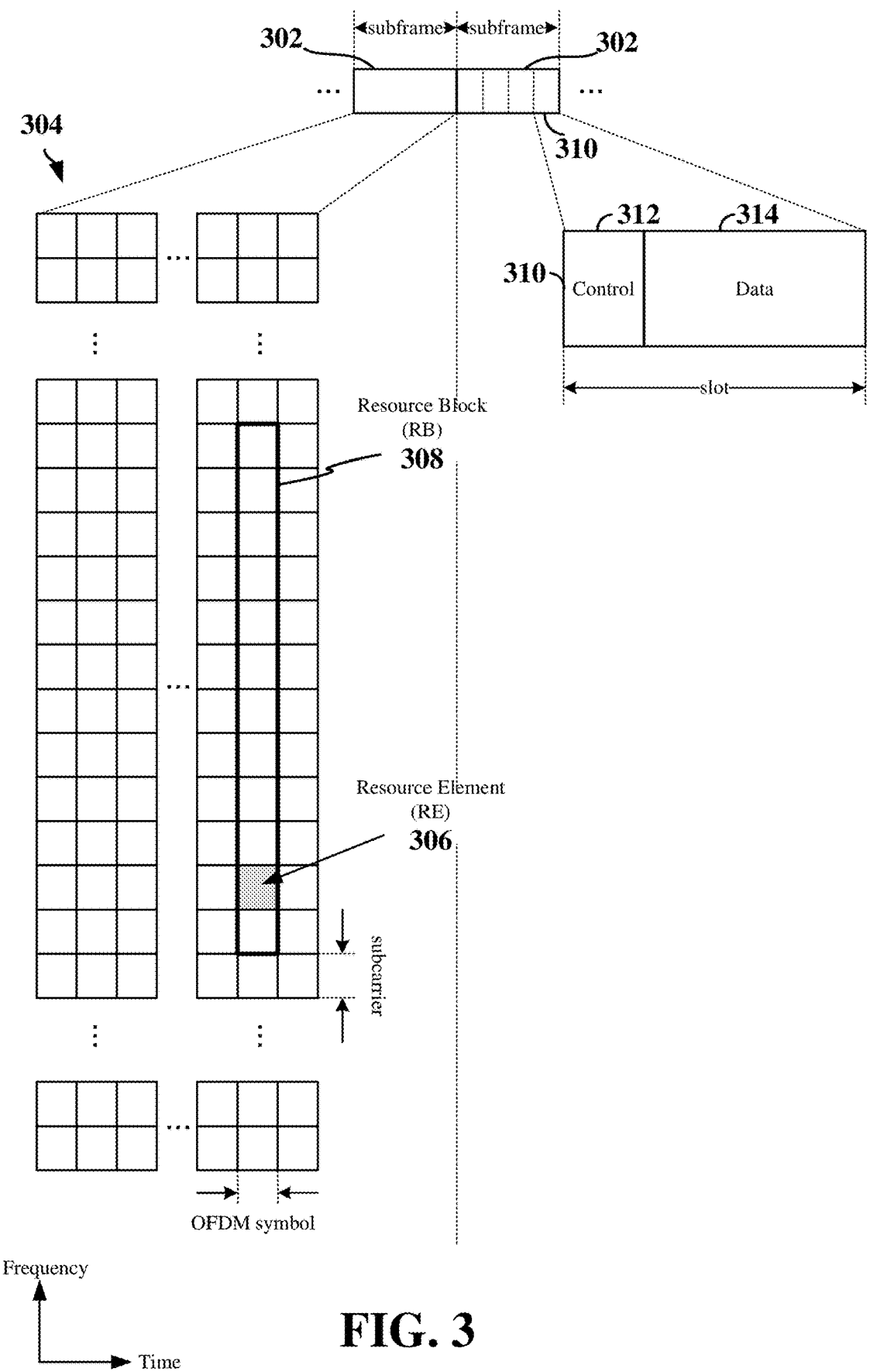
FIG. 3 is a schematic diagram illustrating organization of wireless resources in an air interface utilizing orthogonal frequency divisional multiplexing (OFDM) in accordance with another aspect of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each one (1) millisecond (ms) subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In order to gain access to a cell, a UE may perform a random access procedure over a physical random access channel (PRACH). The UE may identify a random access search space including PRACH resources for initiating a RACH procedure from the SIB1. For example, a random access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 4:
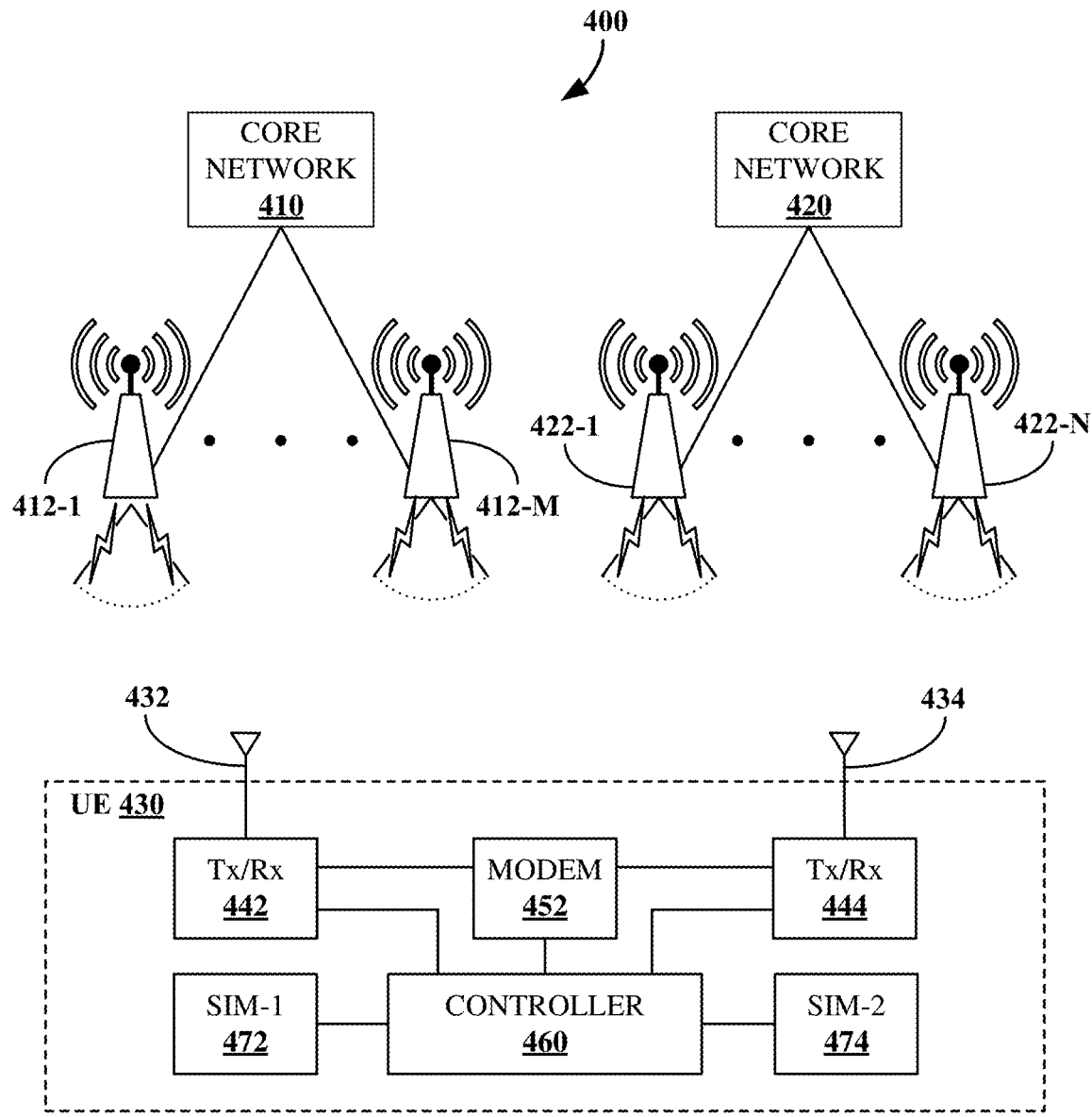
FIG. 4 is a block diagram of an example wireless communication system in accordance with another aspect of the disclosure.

FIG. 4 is a block diagram of an example wireless communication system 400 in accordance with another aspect of the disclosure. The wireless communication system 400 includes a user equipment (UE) 430, a first core network 410 coupled to a first set of cells or base stations 412-1 to 412-M, and a second core network 420 coupled to a second set of cells or base stations 422-1 to 422-N. In this example, the wireless communication system 400 including the core networks 410 and 420, the first and second sets of cells 412-1 to 412-M and 422-1 to 422-N, and the UE 430 may operate in accordance with a certain protocol or standard, such as 5G NR.

In this example, the UE 430 has a plurality (e.g., dual) subscriber identity modules (SIMs). Additionally, the UE 430 may be configured for Dual Receive (DR) or Dual SIM Dual Access (DSDA), as discussed in more detail further herein. More specifically, the UE 430 includes a controller 460, a first subscriber identity module (SIM-1) 472 (including associated SIM reader), a second subscriber identity module (SIM-2) 474 (including associated SIM reader), a modem 452, a first transceiver (Tx/Rx) 442 configured to operate in accordance with the first SIM-1 472, at least one antenna 432 coupled to the first transceiver 442, a second transceiver (Tx/Rx) 444 configured to operate in accordance with the second SIM-2 474, and at least one antenna 434 coupled to the second transceiver 444. The first SIM-1 472 and the second SIM-2 474 are coupled to the controller 460. The transceivers 442 and 444 are controllably coupled to the controller 460 and data coupled to the modem 452. The modem 452 is data coupled to the controller 460.

In accordance with the first SIM-1 472, the UE 430 is able to receive wireless service from the core network 410 via a selected one of the first set of cells 412-1 to 412-M and/or the second set of cells 422-1 to 422-N; that is, with respect to the first SIM-1 472, the UE 430 is camped on the selected cell to receive wireless service therefrom (e.g., the UE is assigned a cell radio network temporary identifier (C-RNTI) from the selected cell, may be in idle mode where it is monitoring paging occasions from the selected cell, and/or may be in connected mode where it is decoding the PDCCH and/or PDSCH from the selected cell). Similarly, in accordance with the second SIM-2 474, the UE 430 is able to receive wireless service from the core network 420 via a selected one of the first set of cells 412-1 to 412-M and/or the second set of cells 422-1 to 422-N; that is, with respect to the second SIM-2 474, the UE 430 is camped on the selected cell to receive wireless service therefrom, as previously discussed.

As the UE 430 is equipped with two transceivers 442 and 444 and associated antennas 432 and 434, the UE 430 may be configured for DR or DSDA mode of operation. In DR mode of operation, the first and second transceivers 442 and 444 may receive signals from cells independently of each other, but may transmit signals to the selected cell in a time-multiplexed manner (e.g., no simultaneous transmission). In DSDA mode of operation, the first and second transceivers 442 and 444 may transmit and receive signals to and from cells independently of each other. As the wireless communication system 400 operates in accordance with a particular protocol or standard (e.g., 5G NR), the first transceiver 442 may receive signals from the first set of cells 412-1 to 412-M and the second set of cells 422-1 and 422-N, and the second transceiver 444 may also receive signals from the first set of cells 412-1 to 412-M and the second set of cells 422-1 and 422-N.

With the aforementioned capabilities, when the UE 430 loses wireless service from the selected cell (often referred to as going out-of-service (OOS) (e.g., as a result of a radio link failure (RLF)) with respect to a particular SIM (e.g., SIM-1), the transceiver associated with the SIM (e.g., SIM-2) that is still receiving wireless service from the selected cell may perform scans for cell signals on behalf of the transceiver associated with the OOS situation. In this way, the UE 430 may recover wireless service for the affected SIM at a faster rate. Additionally, if the UE 430 loses wireless service from the selected cells with respect to both SIMs, the transceivers may be given sets of non-overlapping frequencies to scan for cell signals to eliminate redundant frequency scanning to also expedite the scanning of cell signals and recover from the OOS situation with regard to both SIMs without increasing power consumption in doing so. The following describes various implementations of the aforementioned techniques of transceivers scanning for cell signals on behalf of each other.

Figure 5:
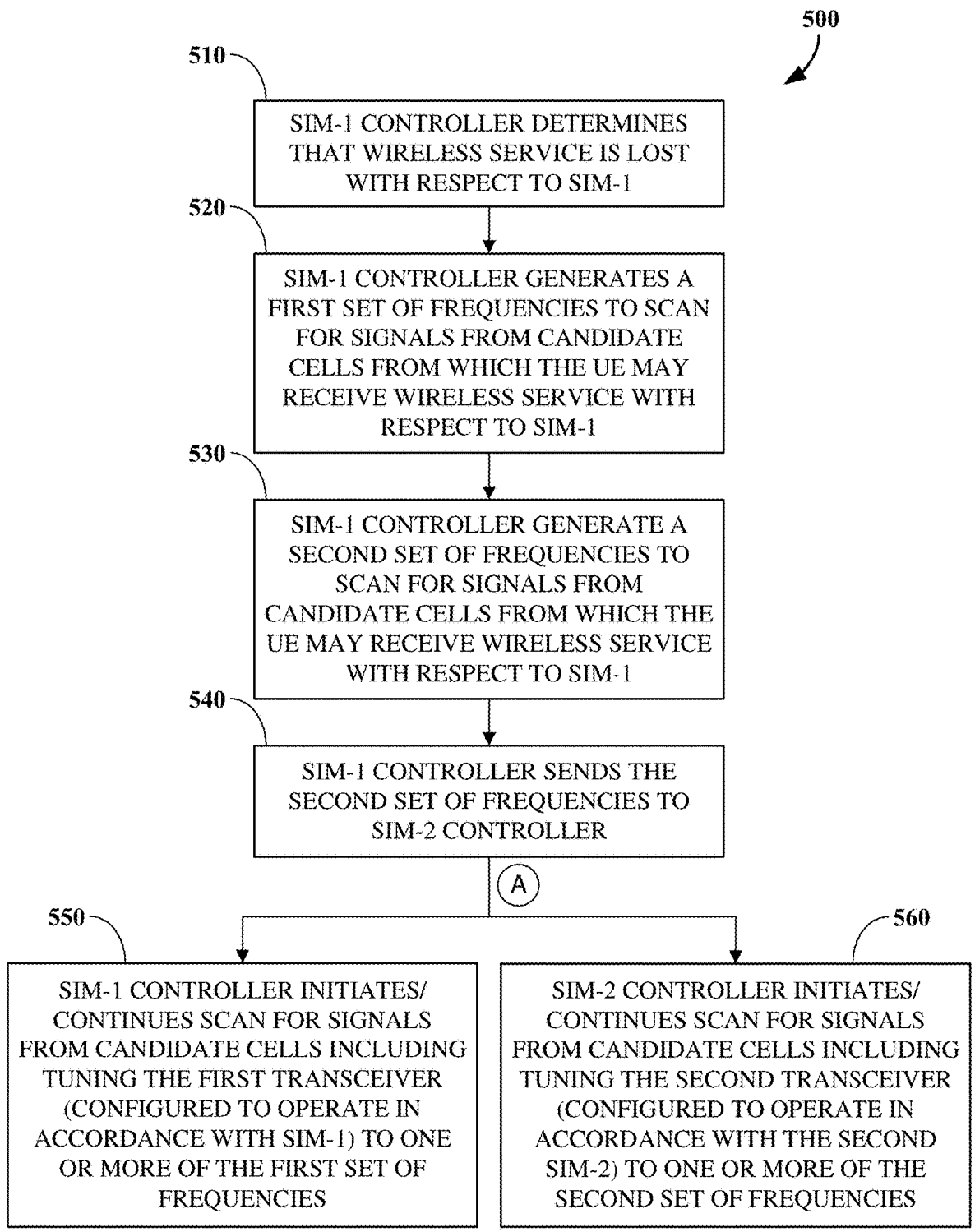
FIG. 5 is a flow diagram of an example method of scanning for cells on behalf of a first subscriber identity module (SIM) by transceivers configured to operate in accordance with the first and second SIMs in accordance with another aspect of the disclosure.

FIG. 5 is a flow diagram of an example method 500 of scanning for cells on behalf of the first SIM-1 472 by transceivers 442 and 444 in accordance with another aspect of the disclosure. In the examples described herein, the UE 430 is shown to include a single controller 460; although it shall be understood that the UE 430 may be implemented with a plurality of controllers. With respect to the description of the method 500 and others as follows, reference to SIM-1 controller 460 may refer to the controller 460 controlling the first transceiver 442, which is configured or assigned to operate in accordance with the first SIM-1 472. Reference to SIM-2 controller 460 may refer to the controller 460 controlling the second transceiver 444, which is configured or assigned to operate in accordance with the second SIM-2 474.

According to the method 500, the SIM-1 controller 460 determines that wireless service is lost with respect to the first SIM-1 472 (block 510). For example, this could mean that the first transceiver 442 is not receiving the signal from the selected cell for a certain period such that it has lost signal timing with the cell and is no longer camped on the cell. This may have been the result of signal interference, blockage, RLF, and/or other causes.

Then, according to the method 500, the SIM-1 controller 460 generates a first set of frequencies (first raster) to scan for signals from candidate cells 412-1 to 412-M and/or 422-1 to 422-N from which the UE 430 may receive wireless service with respect to SIM-1 472 (block 520). The first set of frequencies may have been derived from frequencies used by the first set of cells 412-1 to 412-M and/or the second set of cells 422-1 to 422-N identified in band select and/or acquisition database associated with the core network 410 and/or 420. Further, according to the method 500, the SIM-1 controller 460 generates a second set of frequencies (second raster) to scan for signals from candidate cells 412-1 to 412-M and 422-1 to 422-N from which the UE 430 may receive wireless service with respect to SIM-1 472 (block 530). The second set of frequencies may also have been derived from frequencies used by the first set of cells 412-1 to 412-M and/or the second set of cells 422-1 to 422-N identified in band select and/or acquisition database associated with the core network 410 and/or 420.

The method 500 further includes the SIM-1 controller 460 sending the second set of frequencies to the SIM-2 controller 460 (block 540). For example, if there is a single controller 460, this may mean that the algorithm configured to control the SIM-1 472 operations sends the second set of frequencies to the algorithm configured to control the SIM-2 474 operations. If there are separate controllers, this may mean that the controller configured to control the SIM-1 472 operations sends the second set of frequencies to the controller configured to control the SIM-2 474 operations.

Then, according to the method 500, the SIM-1 controller 460 initiates or continues scanning for signals from candidate cells 412-1 to 412-M and/or 422-1 to 422-N including tuning the first transceiver 442 to one or more of the first set of frequencies (block 550). Concurrently with block 550, the method 500 further includes the SIM-2 controller 460 initiating or continuing scanning for signals from candidate cells 412-1 to 412-M and/or 422-1 to 422-N including tuning the second transceiver 444 to one or more of the second set of frequencies (block 560). As the SIM-2 controller 460 is searching for cells on behalf of SIM-1 472 (and concurrently with SIM-1 controller 460 searching for cells), the recovery time from an OOS situation with respect to SIM-1 472 may be significantly reduced. Also, as the first and second sets of frequencies may be generated such that the sets have non-overlapping frequencies, the power consumption should not increase by having both transceivers 442 and 444 scanning for cell signals on behalf of SIM-1 472.

Figure 6A:
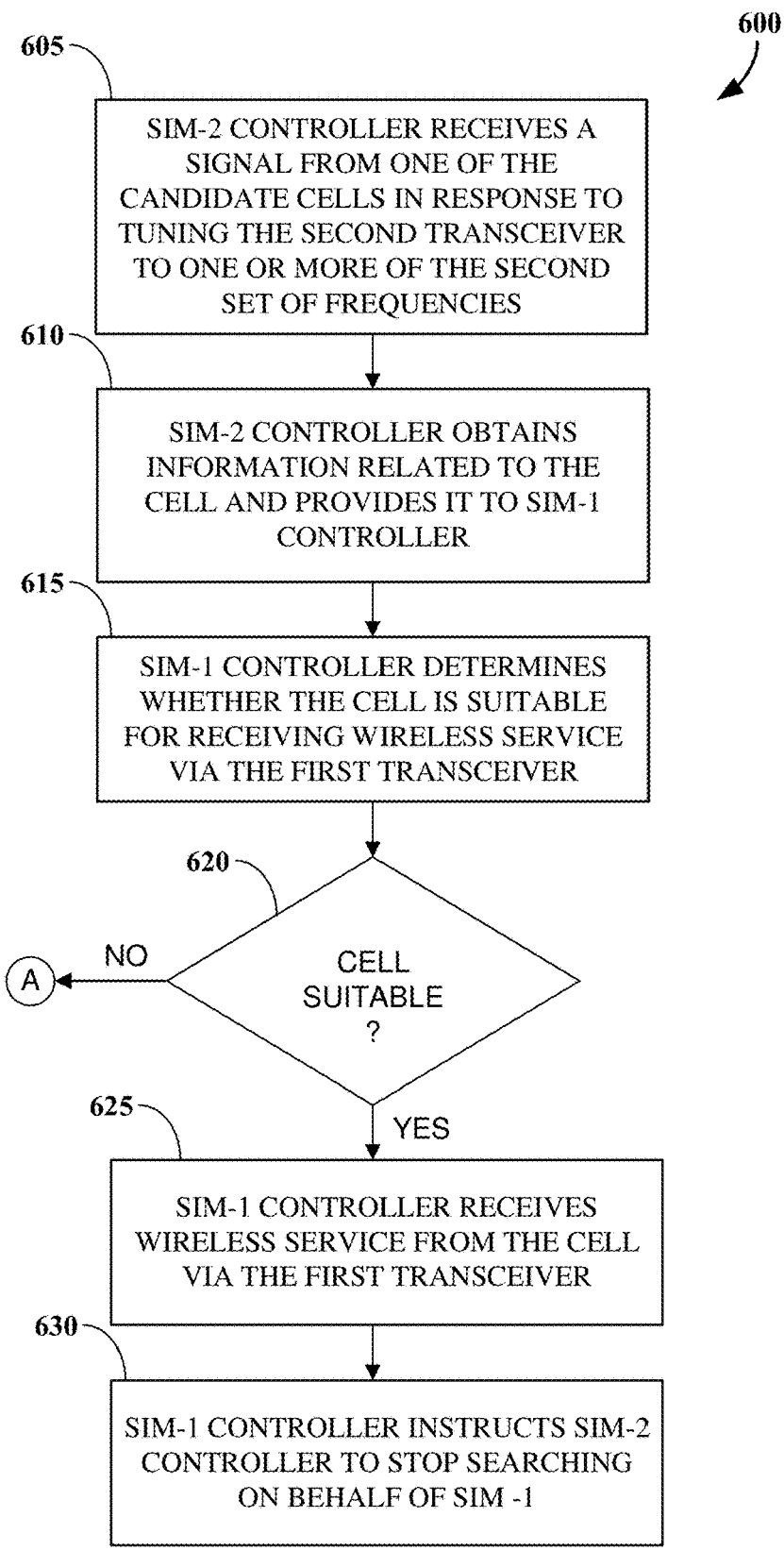
FIGS. 6A-6B are flow diagrams of example methods of receiving wireless service in response to the method of scanning for cells of FIG. 5 in accordance with other aspects of the disclosure.

FIG. 6A is a flow diagram of an example method 600 of receiving wireless service in response to performing the method 500 of scanning for cells on behalf of the first SIM-1 472 by transceivers 442 and 444 in accordance with another aspect of the disclosure. In the example of method 600, the SIM-2 controller 460 operating the second transceiver 444 receives a signal from a candidate cell per the scanning of block 560; for example, before or in the absence of the first transceiver 442 receiving a signal from a candidate cell per the scanning of block 550.

In particular, the method 600 includes the SIM-2 controller 460 receiving a signal from one of the candidate cells 412-1 to 412-M and/or 422-1 to 422-N in response to tuning the second transceiver 444 to one or more of the second set of frequencies per block 560 (block 605). Further, according to the method 600, the SIM-2 controller 460 obtains information (e.g., decodes the master information block (MIB) and/or system information block(s) (SIB(s)) related to the cell via the second transceiver 444 and the modem 452, and provides the cell information to the SIM-1 controller 460 (block 610). Then, according to the method 600, the SIM-1 controller 460 determines whether the cell is suitable for receiving wireless service (e.g., camping on) via the first transceiver 442 (block 615). This may entail determining whether the cell meets the suitability criteria, which may include factors related to received signal level and quality (e.g., Reference Signal Received Power (RSRP), Received Signal Received Quality (RSRQ), and/or others).

If SIM-1 controller 460 determines that the cell does not meet the suitability criteria per block 620, the method 600 may proceed to point "A", block 560, where the SIM-2 controller 460 continues to scan for signals from candidate cells 412-1 to 412-M and/or 422-1 to 422-N. It shall be understood that the scanning for signals from candidate cells 412-1 to 412-M and/or 422-1 to 422-N by the SIM-1 and SIM-2 controller 460 per blocks 550 and 560 need not be halted while the SIM-2 controller 460 received and processed the signal per blocks 605 and 610, and the SIM-1 controller 460 determined the cell suitability per block 615. If in block 620, the SIM-1 controller 460 determines that the cell meets the suitability criteria, then the SIM-1 controller 460 performs the operations to receive wireless service from (camp on) the cell via the first transceiver 442 (block 625). The method 600 may further include the SIM-1 controller 460 instructing the SIM-2 controller 460 to stop searching on behalf of SIM-1 472 (block 630).

Figure 6B:
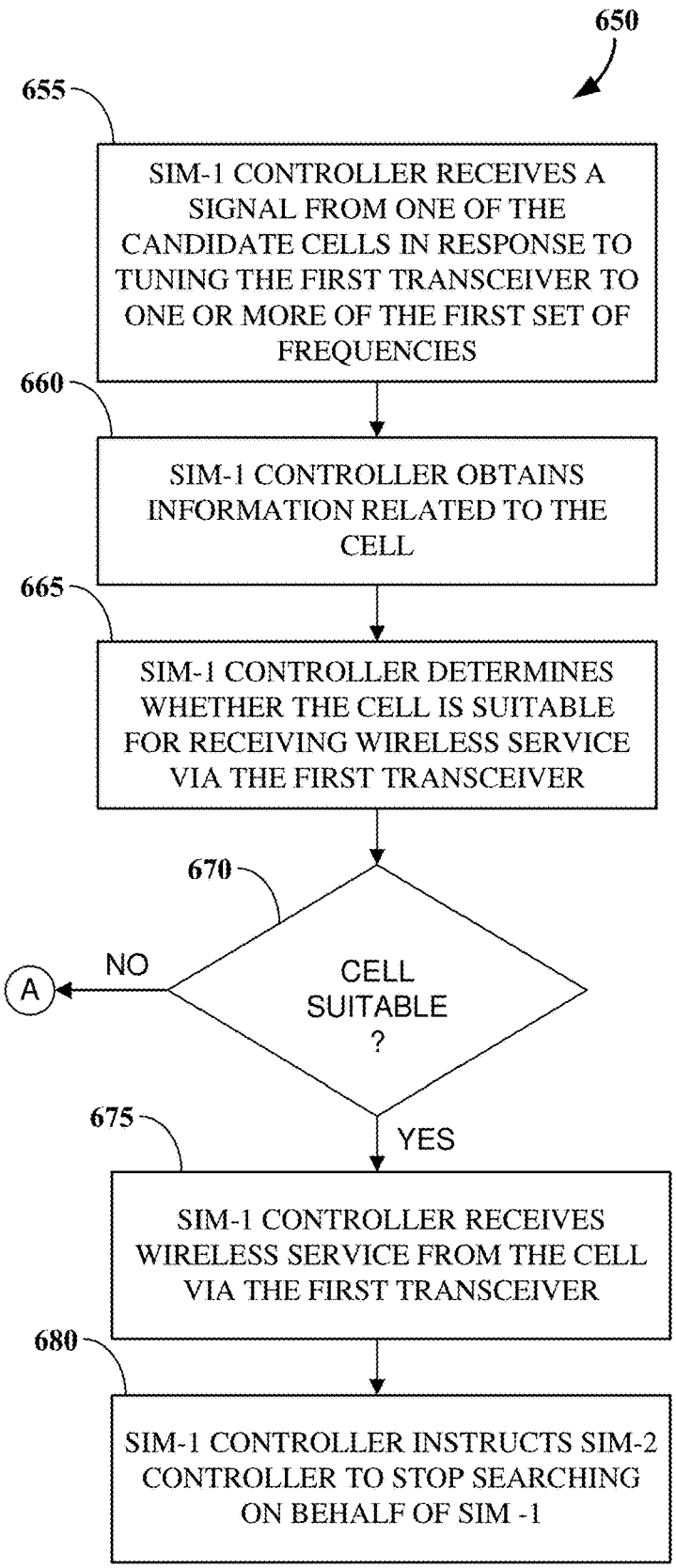

FIG. 6B is a flow diagram of another example method 650 of receiving wireless service in response to performing the method 500 of scanning for cells on behalf of the first SIM-1 472 by transceivers 442 and 444 in accordance with another aspect of the disclosure. In the example of method 650, the SIM-1 controller 460 operating the first transceiver 442 receives a signal from a candidate cell per the scanning of block 550; for example, before or in the absence of the second transceiver 444 receiving a signal from a candidate cell per the scanning of block 560.

In particular, the method 650 includes the SIM-1 controller 460 receiving a signal from one of the candidate cells 412-1 to 412-M and/or 422-1 to 422-N in response to tuning the first transceiver 442 to one or more of the first set of frequencies per block 550 (block 655). Further, according to the method 650, the SIM-1 controller 460 obtains information (e.g., decoding the master information block (MIB) and/or system information block(s) (SIB(s)) related to the cell via the first transceiver 442 and the modem 452 (block 660). Then, according to the method 650, the SIM-1 controller 460 determines whether the cell is suitable for receiving wireless service (e.g., camping on) via the first transceiver 442 (block 665). This may entail determining whether the cell meets the suitability criteria, which may include factors related to receive signal level and quality (e.g., Reference Signal Received Power (RSRP), Received Signal Received Quality (RSRQ), and/or others).

If SIM-1 controller 460 determines that the cell does not meet the suitability criteria per block 670, the method 650 may proceed to point "A", block 550, where the SIM-1 controller 460 continues to scan for signals from candidate cells 412-1 to 412-M and 422-1 to 422-N. It shall be understood that the scanning for signals from candidate cells 412-1 to 412-M and 422-1 to 422-N by the SIM-1 and SIM-2 controller 460 per blocks 550 and 560 need not be halted while the SIM-1 controller 460 receives and processes the cell signal per blocks 655 and 660, and determines the cell suitability per block 665. If in block 670, the SIM-1 controller 460 determines that the cell meets the suitability criteria, then the SIM-1 controller 460 performs the operations to receive wireless service from (camps on) the cell via the first transceiver 442 (block 675). The method 650 may further include the SIM-1 controller 460 instructing the SIM-2 controller 460 to stop searching on behalf of SIM-1 472 (block 680).

Figure 7:
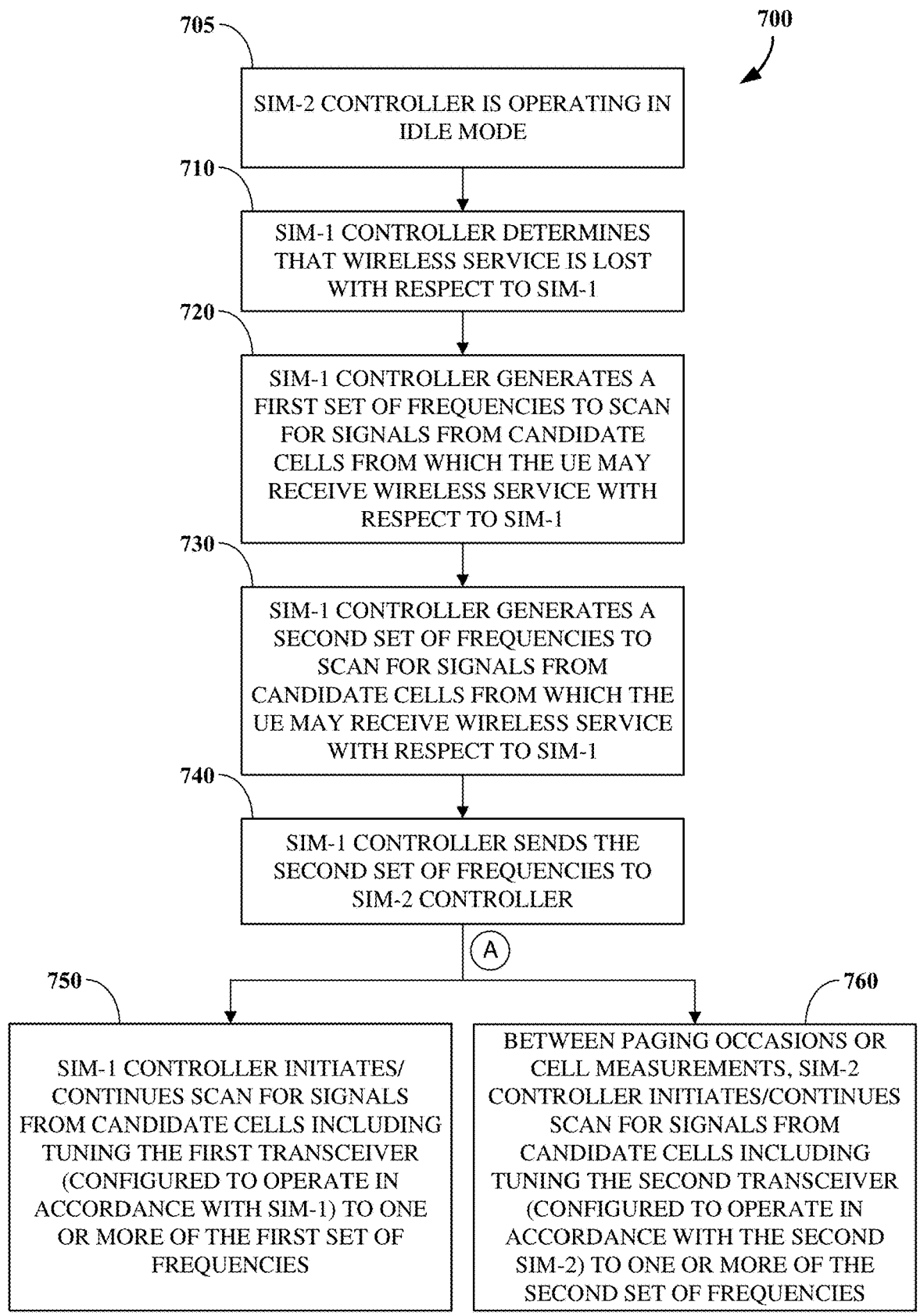
FIG. 7 is a flow diagram of another example method of scanning for cells on behalf of a first subscriber identity module (SIM) by transceivers configured to operate in accordance with the first and second SIMs in accordance with another aspect of the disclosure.

FIG. 7 is a flow diagram of another example method 700 of scanning for cells on behalf of the first SIM-1 472 by transceivers 442 and 444 when the UE 430 is operating in idle mode of operation with respect to the second SIM-2 474. In idle mode, the UE 430 may be checking paging occasions and/or performing cell measurements for cell reselection purposes with respect to the second SIM-2 474.

In particular, the method 700 includes the SIM-2 controller 460 operating in idle mode of operation (block 705). As discussed above, this may entail operating the second transceiver 444 and the modem 452 to check paging occasions and/or perform cell measurements for cell reselection with respect to the second SIM-2 474. Then, according to the method 700, the SIM-1 controller 460 determines that wireless service is lost with respect to the first SIM-1 472 (block 710). As mentioned, this could mean that the first transceiver 442 is not receiving the signal from the selected cell for a certain period such that it has lost signal timing with the cell and is no longer camped on the cell. This may have been the result of signal interference, blockage, RLF, or other causes.

Then, according to the method 700, the SIM-1 controller 460 generates a first set of frequencies (first raster) to scan for signals from candidate cells 412-1 to 412-M and/or 422-1 to 422-N from which the UE 430 may receive wireless service with respect to SIM-1 472 (block 720). The first set of frequencies may have been derived from frequencies used by the first set of cells 412-1 to 412-M and/or the second set of cells 422-1 to 422-N identified in band select and/or acquisition database associated with the core network 410 and/or 420. Further, according to the method 700, the SIM-1 controller 460 generates a second set of frequencies (second raster) to scan for signals from candidate cells 412-1 to 412-M and/or 422-1 to 422-N from which the UE 430 may receive wireless service with respect to SIM-1 472 (block 730). The second set of frequencies may also have been derived from frequencies used by the first set of cells 412-1 to 412-M and/or the second set of cells 422-1 to 422-N identified in band select and/or acquisition database associated with the core network 410 and/or 420.

The method 700 further includes the SIM-1 controller 460 sending the second set of frequencies to the SIM-2 controller 460 (block 740). For example, if there is a single controller 460, this may mean that the algorithm configured to control the SIM-1 472 operations sends the second set of frequencies to the algorithm configured to control the SIM-2 474 operations. If there are separate controllers, this may mean that the controller configured to control the SIM-1 472 operations sends the second set of frequencies to the controller configured to control the SIM-2 474 operations.

Then, according to the method 700, the SIM-1 controller 460 initiates or continues scanning for signals from candidate cells 412-1 to 412-M and/or 422-1 to 422-N including tuning the first transceiver 442 to one or more of the first set of frequencies (block 750). Concurrently with block 750, the method 700 further includes the SIM-2 controller 460 initiating or continuing scanning for signals from candidate cells 412-1 to 412-M and/or 422-1 to 422-N including tuning the second transceiver 444 to one or more of the second set of frequencies during, what would otherwise be the sleep intervals between, paging occasions and/or cell measurements per idle mode of operation (block 760).

As the SIM-2 controller 460 is scanning for cells on behalf of SIM-1 472 (and concurrently with SIM-1 controller 460 scanning for cells), the recovery time from an OOS situation with respect to SIM-1 472 may be significantly reduced. Also, as the first and second sets of frequencies may be generated such that the sets have non-overlapping frequencies, the power consumption should not increase by having both transceivers 442 and 444 scan for cell signals on behalf of SIM-1 472.

Figure 8:
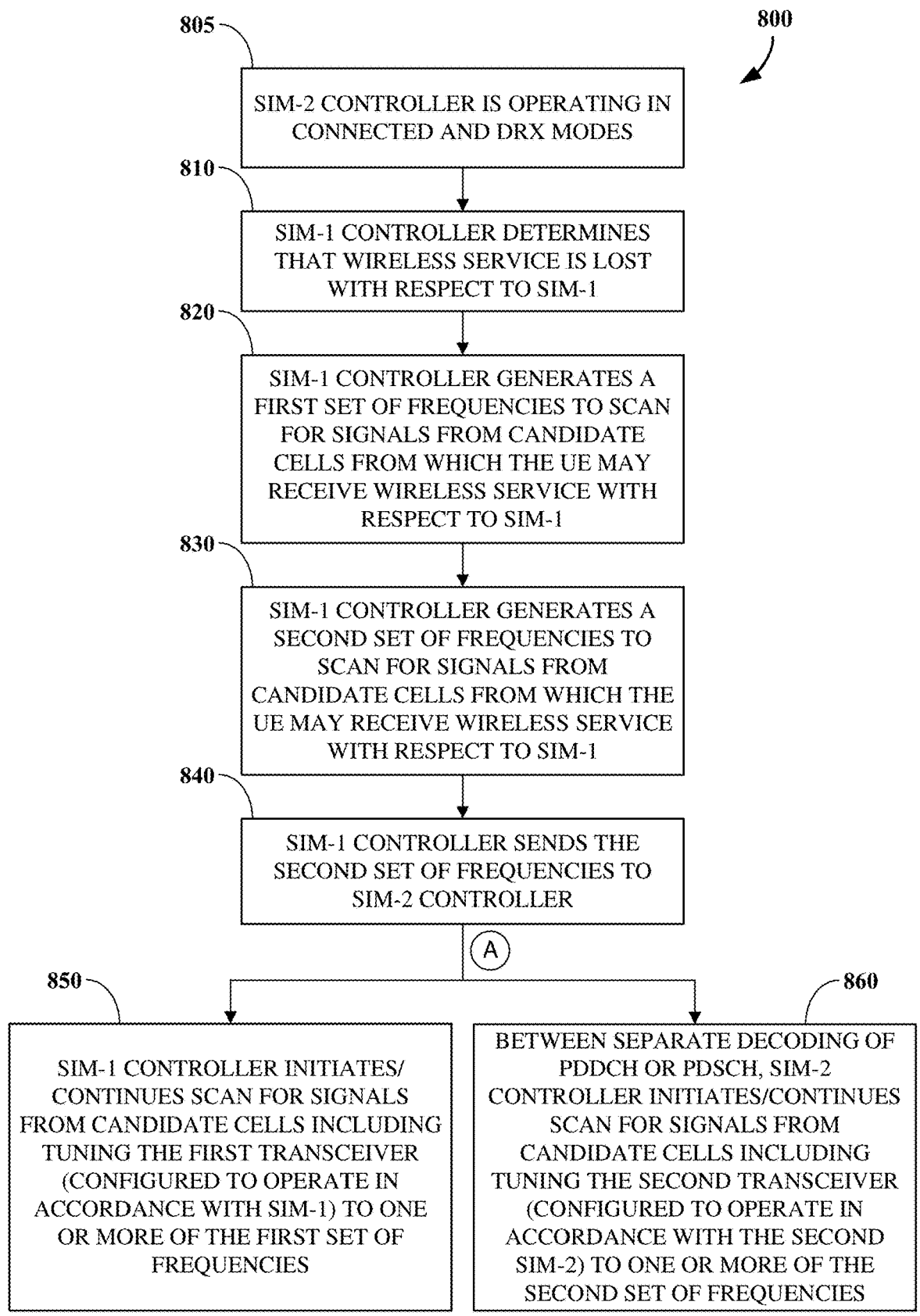
FIG. 8 is a flow diagram of another example method of scanning for cells on behalf of a first subscriber identity module (SIM) by transceivers configured to operate in accordance with the first and second SIMs in accordance with another aspect of the disclosure.

FIG. 8 is a flow diagram of another example method 800 of scanning for cells on behalf of the first SIM-1 472 by transceivers 442 and 444 when the UE 430 is operating in connected and discontinuous reception (DRX) modes with respect to the second SIM-2 474. In connected and DRX modes of operation, the UE 430 may be performing separate decoding of the PDCCH and/or PDSCH from the selected cell associated with the second SIM-2 474.

In particular, the method 800 includes the SIM-2 controller 460 operating in connected and DRX modes of operation (block 805). As discussed above, this may entail operating the second transceiver 444 and the modem 452 to receive and decode the PDCCH and/or PDSCH to check and/or receive data for the UE 430 with respect to the second SIM-2 474. Then, according to the method 800, the SIM-1 controller 460 determines that wireless service is lost with respect to the first SIM-1 472 (block 810). As mentioned, this could mean that the first transceiver 442 is not receiving the signal from the selected cell for a certain period such that it has lost signal timing with the cell and is no longer camped on the cell. This may have been the result of signal interference, blockage, RLF, or other causes.

Then, according to the method 800, the SIM-1 controller 460 generates a first set of frequencies (first raster) to scan for signals from candidate cells 412-1 to 412-M and/or 422-1 to 422-N from which the UE 430 may receive wireless service with respect to SIM-1 472 (block 820). The first set of frequencies may have been derived from frequencies used by the first set of cells 412-1 to 412-M and/or the second set of cells 422-1 to 422-N identified in band select and/or acquisition database associated with the core network 410 and/or 420. Further, according to the method 800, the SIM-1 controller 460 generates a second set of frequencies (second raster) to search for signals from candidate cells 412-1 to 412-M and/or 422-1 to 422-N from which the UE 430 may receive wireless service with respect to SIM-1 472 (block 830). The second set of frequencies may also have been derived from frequencies used by the first set of cells 412-1 to 412-M and/or the second set of cells 422-1 to 422-N identified in band select and/or acquisition database associated with the core network 410 and/or 420.

The method 800 further includes the SIM-1 controller 460 sending the second set of frequencies to the SIM-2 controller 460 (block 840). For example, if there is a single controller 460, this may mean that the algorithm configured to control the SIM-1 472 operations sends the second set of frequencies to the algorithm configured to control the SIM-2 474 operations. If there are separate controllers, this may mean that the controller configured to control the SIM-1 472 operations sends the second set of frequencies to the controller configured to control the SIM-2 474 operations.

Then, according to the method 800, the SIM-1 controller 460 initiates or continues scanning for signals from candidate cells 412-1 to 412-M and/or 422-1 to 422-N including tuning the first transceiver 442 to one or more of the first set of frequencies (block 850). Concurrently with block 850, the method 800 further includes the SIM-2 controller 460 initiating or continuing scanning for signals from candidate cells 412-1 to 412-M and/or 422-1 to 422-N including tuning the second transceiver 444 to one or more of the second set of frequencies between decoding of the PDCCH and/or the PDSCH per connected and DRX modes of operation (block 860).

As the SIM-2 controller 460 is scanning for cells on behalf of SIM-1 472 (and concurrently with SIM-1 controller 460 scanning for cells), the recovery time from an OOS situation with respect to SIM-1 472 may be significantly reduced. Also, as the first and second sets of frequencies may be generated such that the sets have non-overlapping frequencies, the power consumption should not increase by having both transceivers 442 and 444 scan for cell signals on behalf of SIM-1 472.

Figures 9, 10, 11:
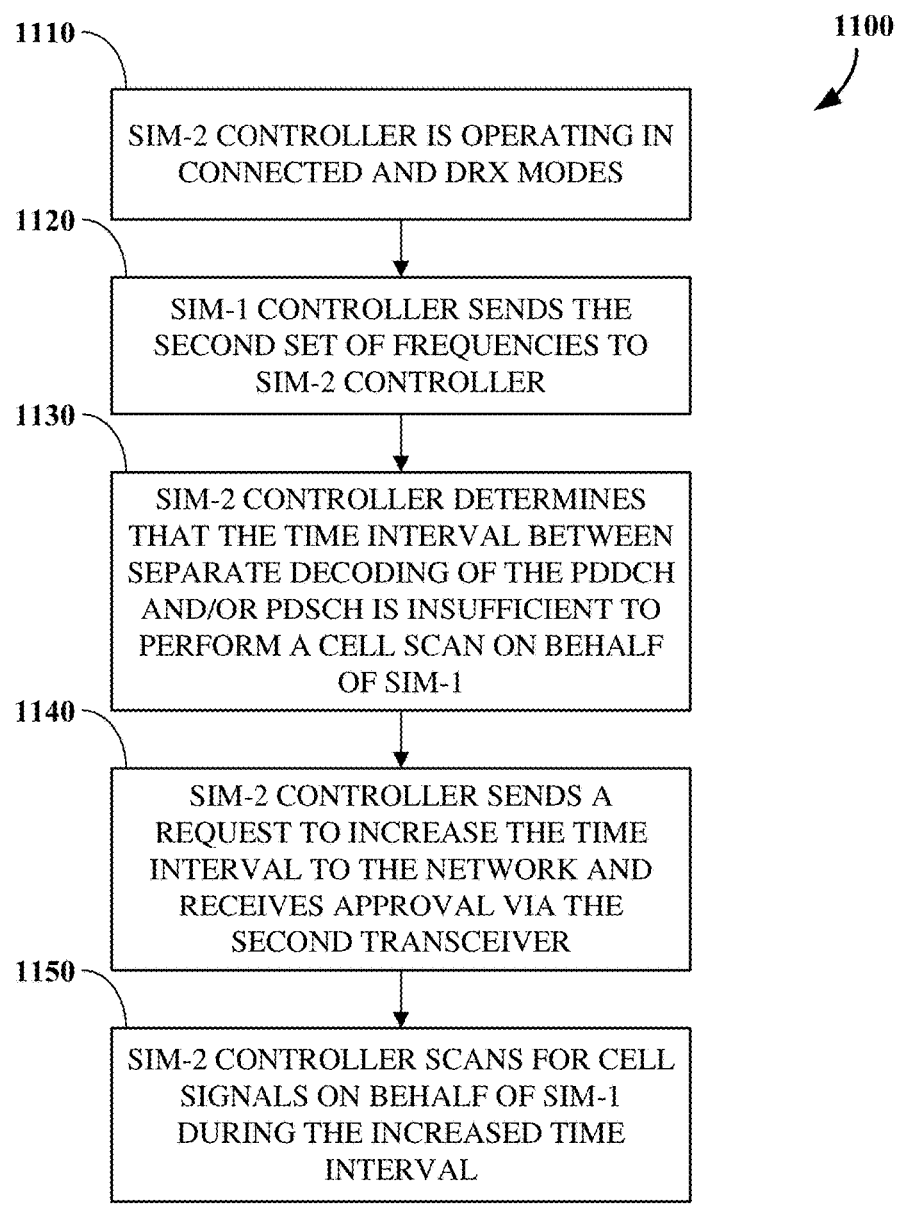
FIGS. 9-10 illustrate timing diagrams of example operations including scanning for cells on behalf of another subscriber identity module (SIM) in accordance with other aspects of the disclosure.
FIG. 11 illustrates a flow diagram of an example method of requesting an increased time interval to scan for cells on behalf of another subscriber identity module (SIM) in accordance with another aspect of the disclosure.

FIG. 9 illustrates a timing diagram of example operation including scanning for cells on behalf of another subscriber identity module (SIM) in accordance with another aspect of the disclosure. The horizontal axis of the timing diagram represents time. The example operation may relate to when the UE 430 is operating in idle mode with respect to a SIM (e.g., SIM-2), and is searching for signals from candidate cells on behalf of another SIM (e.g., SIM-1). For example, in idle mode of operation, the UE 430 may periodically, or per some other time-basis, check paging occasions and/or perform cell measurements for cell reselection purposes with respect to the second SIM-2 474. This is represented in the timing diagram per the two boxes on the left and the two boxes on the right of the timing diagram.

In idle mode, the time interval between the paging occasions and/or cell measurements is typically reserved for the UE 430 to enter a sleep mode, where the power consumption is significantly less than during the time the UE 430 is checking paging occasions and/or performing cell measurements. However, per the method 700 previously discussed, during the time interval between paging occasions and/or cell measurements, which the UE 430 would otherwise go into sleep mode with respect to SIM-2 474, the SIM-2 controller 460 performs scans for signals from candidate cells 412-1 to 412-M and/or 422-1 to 422-N on behalf of SIM-1 472 per the operation discussed with reference to block 760. This is represented in the timing diagram in the middle box.

FIG. 10 illustrates a timing diagram of example operation including scanning for cells on behalf of another subscriber identity module (SIM) in accordance with another aspect of the disclosure. The horizontal axis of the timing diagram represents time. The example operation may relate to when the UE 430 is operating in connected and DRX modes with respect to a SIM (e.g., SIM-2), and is scanning for signals from candidate cells on behalf of another SIM (e.g., SIM-1). For example, in connected and DRX modes of operation, the UE 430 may periodically, or per some other time-basis, decode the PDCCH and/or PDSCH with respect to the second SIM-2 474. This is represented in the timing diagram per the boxes on the left and right of the timing diagram.

In connected and DRX modes, the time interval between the decoding of the PDCCH and/or PDSCH is typically reserved for the UE 430 to enter a sleep mode, where the power consumption is significantly less than during the time the UE 430 is decoding of the PDCCH and/or PDSCH. However, per the method 800 previously discussed, during the time interval between separate decoding of the PDCCH and/or PDSCH, which the UE 430 would otherwise go into sleep mode with respect to SIM-2 474, the SIM-2 controller 460 performs scans for signals from candidate cells 412-1 to 412-M and/or 422-1 to 422-N on behalf of SIM-1 per the operation discussed with reference to block 860. This is represented in the timing diagram in the middle box.

FIG. 11 illustrates a flow diagram of an example method 1100 of requesting an increased time interval to scan for cells on behalf of another subscriber identity module (SIM) in accordance with another aspect of the disclosure. In this example, the UE 430 is operating in connected and DRX modes of operation with respect to the second SIM-2 474. As discussed with reference to the timing diagram of FIG. 10, in these modes, the SIM-2 controller 460 performs scans for signals from candidate cells 412-1 to 412-M and/or 422-1 to 422-N on behalf of SIM-1 472 between separate decoding of the PDCCH and/or PDSCH. This time interval would otherwise be reserved for sleep time where the UE 430 is operating in a lower power consumption mode with respect to the second SIM-2 474. However, the SIM-2 controller 460 may determine that the time interval is insufficient to perform the desired scan or scans. The method 1100 addresses this issue.

According to the method 1100, the SIM-2 controller 460 is operating in connected and DRX modes of operation (block 1110). The method 1100 further includes the SIM-1 controller 460 sending the second set of frequencies to the SIM-2 controller 460, as previously discussed (block 1120). Then, according to the method 1100, the SIM-2 controller 460 determines that the time interval between separate decoding of the PDCCH and/or PDSCH is insufficient to perform a cell scan on behalf of the first SIM-1 472 (1130). In response to the determination per block 1130, the method 1100 further includes the SIM-2 controller 460 sending a request (e.g., a UE Assistance Information (UAI) request) to and receiving approval of the request from the network 420 via the modem 452 and second transceiver 444 to increase the time interval between decoding of the PDCCH and/or PDSCH (block 1140). In response to the request and approval per block 1140, the method 110 includes the SIM-2 controller 460 scanning for signals from candidate cells during the increased time interval between separate decoding of the PDCCH and PDSCH (block 1150).

Figure 12A:
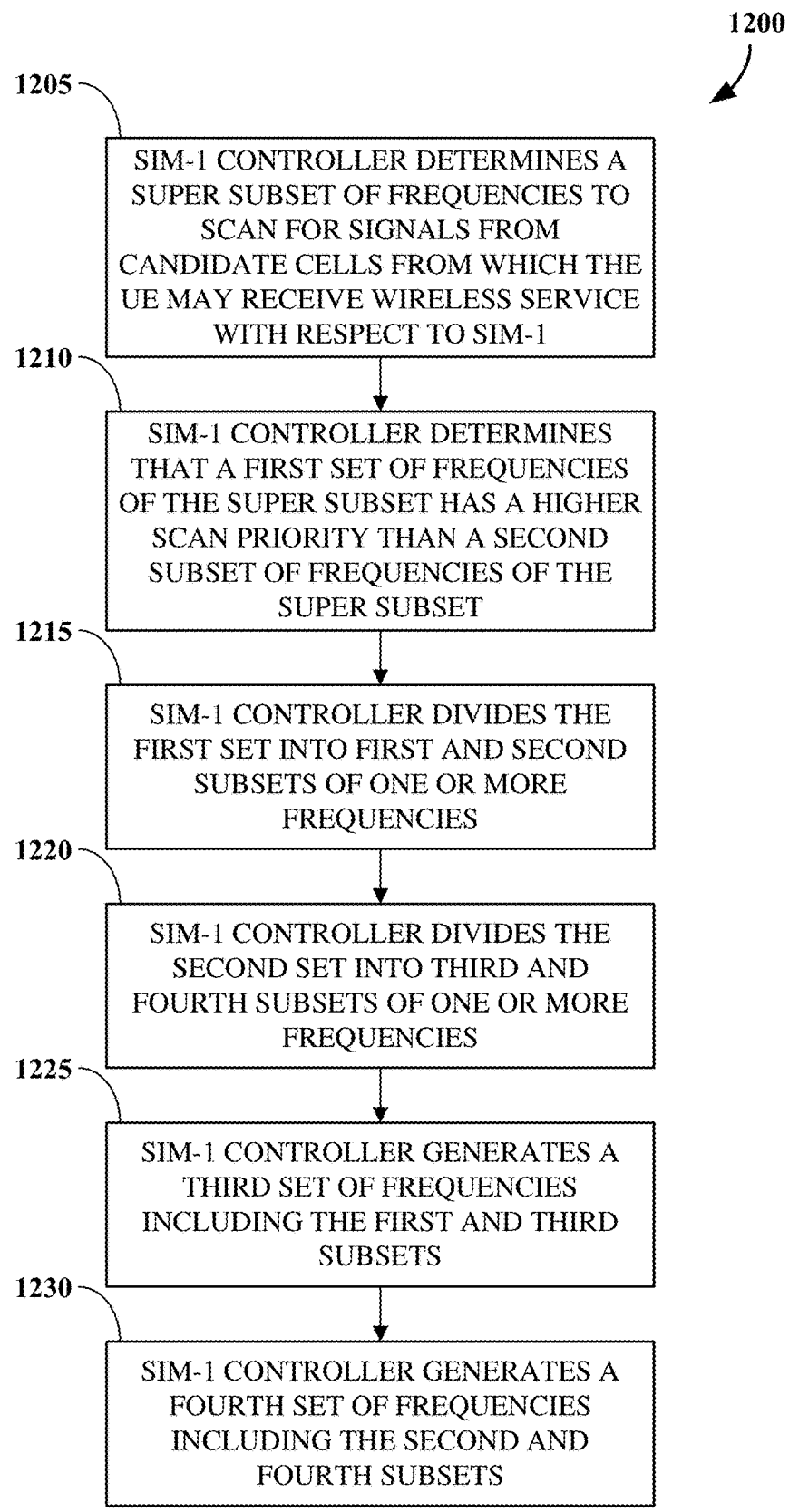
FIG. 12A illustrates a flow diagram of an example method of generating sets of frequencies for scanning for cell signals based on scan frequency priority in accordance with another aspect of the disclosure.

FIG. 12A illustrates a flow diagram of an example method 1200 of generating sets of frequencies for scanning for cell signals based on a scan frequency priority in accordance with another aspect of the disclosure. As discussed with reference to the method 500, the SIM-1 controller 460 generates a first set of frequencies to scan for signals from candidate cells from which the UE may receive wireless service with respect to SIM-1 472 per block 520. The SIM-1 controller 460 generates a second set of frequencies to scan for signals from candidate cells from which the UE may receive wireless service with respect to SIM-1 472 per block 530. The SIM-1 controller 460 uses the first set of frequencies for scanning for cell signals per block 550, and the SIM-2 controller 460 uses the second set of frequencies for scanning for cell signals per block 560.

The method 1200 describes an example technique of generating the first and second sets of frequencies based on a scan frequency priority. In the method 1200 as described herein, the first and second sets of frequencies as referred to in method 500 are referred to as third and fourth sets of frequencies in method 1200.

In particular, the method 1200 includes the SIM-1 controller 460 determining a super subset of frequencies to scan for signals from candidate cells from which the UE 430 may receive wireless service with respect to SIM-1 472 (block 1205). The super subset of frequencies may be frequencies of the signals transmitted by the candidate cells 412-1 to 412-M and/or 422-1 to 422-N. The method 1200 further includes the SIM-1 controller 460 determining that a first set of frequencies of the super subset of frequencies has a higher scan priority than a second subset of frequencies of the super subset (block 1210). For example, based on network and/or UE preferences, some of the frequencies in the super subset has higher scan priority and are to be searched before other frequencies of the super subset with lower scan priority.

Then, according to the method 1200, the SIM-1 controller 460 divides the first set of frequencies into first and second subsets of one or more frequencies (block 1215). The first and second subsets of frequencies represent the higher scan priority frequencies. Further, according to the method 1200, the SIM-1 controller 460 divides the second set of frequencies into third and fourth subsets of one or more frequencies (block 1220). The third and fourth subsets of frequencies represent the lower scan priority frequencies.

The method 1200 additionally includes the SIM-1 controller 460 generating the third set of frequencies including the first and third subsets of frequencies (block 1225). Thus, the third set of frequencies includes the higher scan priority first subset of one or more frequencies, and the lower scan priority third subset of one or more frequencies. As discussed in more detail further herein, the third set of frequencies is used by the SIM-1 controller 460 for scanning purposes.

Similarly, the method 1200 additionally includes the SIM-1 controller 460 generating the fourth set of frequencies including the second and fourth subsets of frequencies (block 1230). Thus, the fourth set of frequencies includes the higher scan priority second subset of one or more frequencies, and the lower scan priority fourth subset of one or more frequencies. As discussed in more detail further herein, the fourth set of frequencies is used by the SIM-2 controller 460 for scanning on behalf of SIM-1 472 purposes.

Figure 12B:
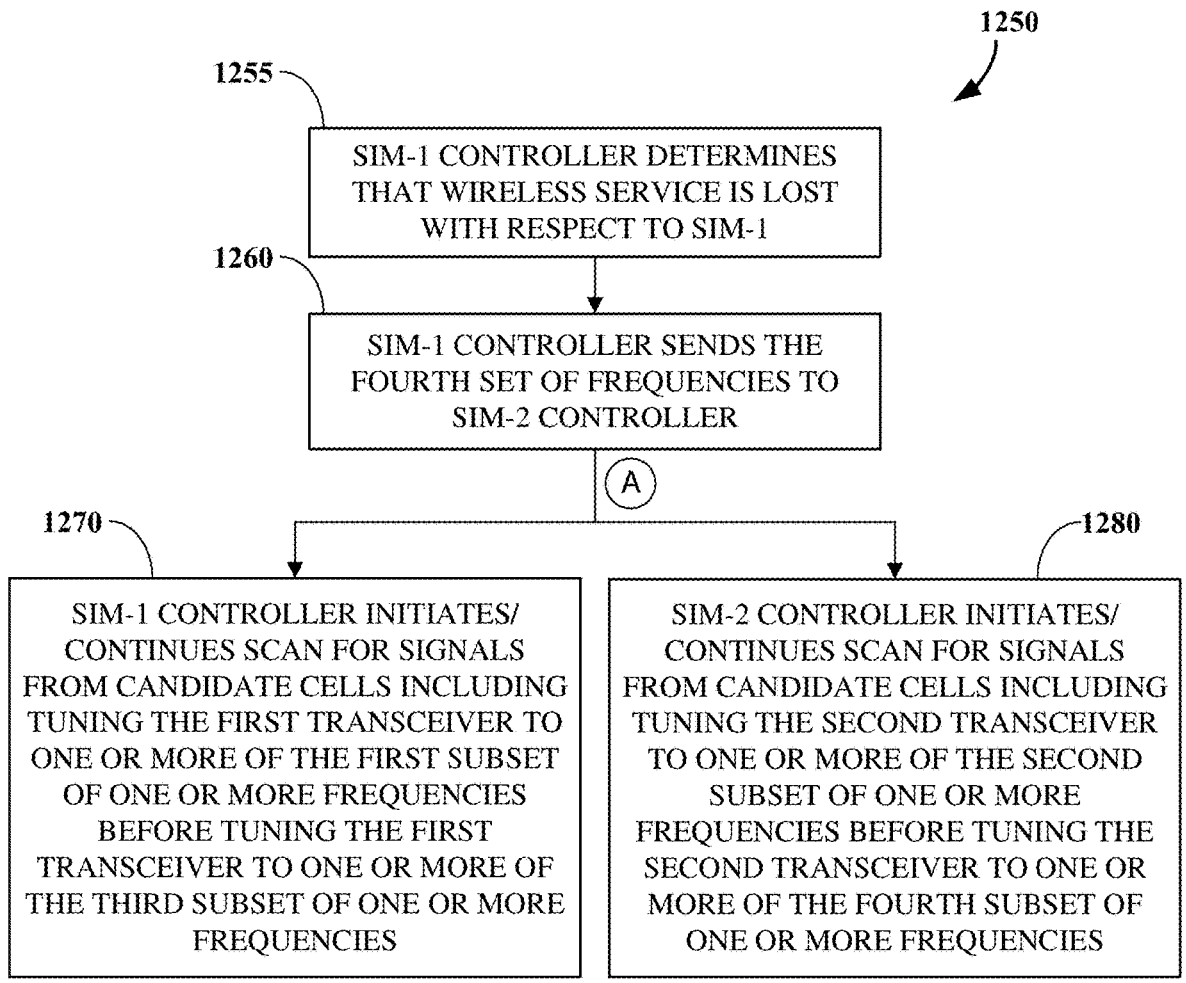
FIG. 12B illustrates a flow diagram of an example method of scanning for cells on behalf of a first subscriber identity module (SIM) by transceivers configured to operate in accordance with the first and second SIMs based on a scan frequency priority in accordance with another aspect of the disclosure.

FIG. 12B illustrates a flow diagram of an example method 1250 of scanning for cell signals on behalf of the SIM-1 472 by transceivers 442 and 444 based on a scan frequency priority in accordance with another aspect of the disclosure. According to the method 1250, the SIM-1 controller 460 determines that wireless service is lost with respect to the first SIM-1 472 (block 1255).

The method 1250 further includes the SIM-1 controller 460 sending the fourth set of frequencies to the SIM-2 controller 460 (block 1260). As previously discussed, the SIM-1 controller 460 generates the fourth set of frequencies pursuant to block 1230 of method 1200. Also, as previously discussed, if there is a single controller 460, this may mean that the algorithm configured to control the SIM-1 472 operations sends the fourth set of frequencies to the algorithm configured to control the SIM-2 474 operations. If there are separate controllers, this may mean that the controller configured to control the SIM-1 472 operations sends the fourth set of frequencies to the controller configured to control the SIM-2 474 operations.

The method 1250 further includes the SIM-1 controller 460 initiating or continuing scanning for signals from candidate cells 412-1 to 412-M and/or 422-1 to 422-N including tuning the first transceiver 442 to one or more of the first subset of one or more frequencies before tuning the first transceiver 442 to one or more of the third subset of one or more frequencies (block 1270). As previously discussed, the first subset of one or more frequencies has higher scan priority than the third subset of one or more frequencies, so the first subset is scanned before the third subset, if needed, is scanned.

Concurrently with block 1270, the method 1250 further includes the SIM-2 controller 460 initiating or continuing scanning for signals from candidate cells 412-1 to 412-M and/or 422-1 to 422-N including tuning the second transceiver 444 to one or more of the second subset of one or more frequencies before tuning the second transceiver 444 to one or more of the fourth subset of one or more frequencies (block 1280). As previously discussed, the second subset of one or more frequencies has higher scan priority than the fourth subset of one or more frequencies, so the second subset is scanned before the fourth subset, if needed, is scanned. Note that the method 1250 includes point "A" that method 600 or 650 may return to if the current cell is determined not to be a suitable cell as previously discussed.

Figure 13A:
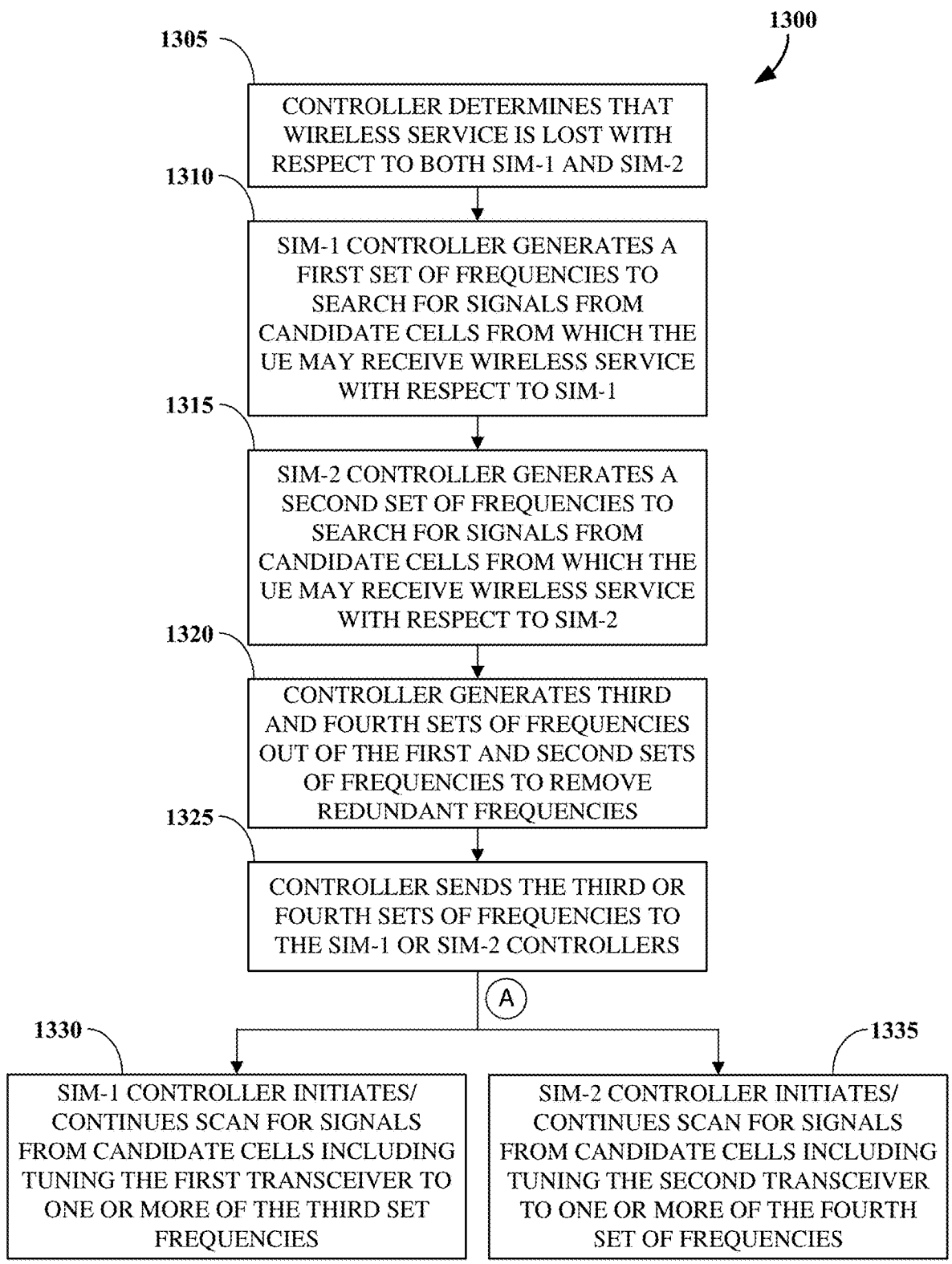
FIG. 13A illustrates a flow diagram of an example method of non-overlapping scanning for cells on behalf of a first and second subscriber identity modules (SIMs) by transceivers configured to operate in accordance with the first and second SIMs in accordance with another aspect of the disclosure.

FIG. 13A illustrates a flow diagram of an example method 1300 of non-overlapping scanning for cells on behalf of the first and second SIM-1 472 and SIM-2 474 by transceivers 442 and 444 in accordance with another aspect of the disclosure.

According to the method 1300, the SIM-1 controller 460 determines that wireless service is lost with respect to both the first SIM-1 472 and the second SIM-2 474 (block 1305). For example, this could mean that the first and second transceivers 442 and 444 are not receiving signals from the selected cells for a certain period such that they have lost signal timing with the cells and are no longer camped on the cells. This may have been the result of signal blockage affecting both transceivers 442 and 444 where the UE 430 has entered a tunnel, elevator, or other Faraday cage type enclosure; signal interference affecting both transceivers 442 and 444; RLFs affecting both transceivers 442 and 444; or other causes.

Then, according to the method 1300, the SIM-1 controller 460 generates a first set of frequencies (first raster) to search for signals from candidate cells 412-1 to 412-M and/or 422-1 to 422-N from which the UE 430 may receive wireless service with respect to SIM-1 472 (block 1310). The first set of frequencies may have been derived from frequencies used by the first set of cells 412-1 to 412-M and/or the second set of cells 422-1 to 422-N identified in band select and/or acquisition database associated with the core network 410 and/or 420. Further, according to the method 1300, the SIM-2 controller 460 generates a second set of frequencies (second raster) to search for signals from candidate cells 412-1 to 412-M and/or 422-1 to 422-N from which the UE 430 may receive wireless service with respect to SIM-2 474 (block 1315). The second set of frequencies may also have been derived from frequencies used by the first set of cells 412-1 to 412-M and/or the second set of cells 422-1 to 422-N identified in band select and/or acquisition database associated with the core network 410 and/or 420.

The method 1300 further includes the controller 460 generating third and fourth sets of frequencies out of the first and second sets of frequencies to remove redundant frequencies (block 1320). This is done so that there are no overlapping frequencies in the third and fourth sets of frequencies; and therefore, redundant frequency scanning of the first and second transceivers 442 and 44 is avoided.

The method 1300 further includes the controller 460 sending the third and fourth sets of frequencies to the SIM-1 and SIM-2 controller (block 1325). For example, if there is a single controller 460, this may mean that a common algorithm may send the third and fourth sets of frequencies to the algorithms controlling the SIM-1 472 and SIM-2 474 operations. Or this could mean the SIM-1 controller 460 (if it is the one that created the third and fourth sets of frequencies) algorithm configured to control the SIM-1 472 operations sending the fourth set of frequencies to the algorithm configured to control the SIM-2 474 operation. If there are separate controllers, this may mean that a controller configured to control cell searching for both SIMs sending the third set of frequencies to the controller configured to control the SIM-1 472 operations and sending the fourth set of frequencies to the controller configured to control the SIM-2 474 operations.

Then, according to the method 1300, the SIM-1 controller 460 initiates or continues scanning for signals from candidate cells 412-1 to 412-M and/or 422-1 to 422-N including tuning the first transceiver 442 to one or more of the third set of frequencies (block 1330). Concurrently with block 1330, the method 1300 further includes the SIM-2 controller 460 initiating or continuing scanning for signals from candidate cells 412-1 to 412-M and/or 422-1 to 422-N including tuning the second transceiver 444 to one or more of the fourth set of frequencies (block 1335).

As both SIM-1 and SIM-2 controller 460 are scanning for cells to camp on in a non-frequency-overlapping manner, the recovery time from an OOS situation with respect to both SIM-1 472 and SIM-474 may be significantly reduced. Further, as the first and second sets of frequencies may be generated such that the sets have non-overlapping frequencies, the power consumption should not increase by having both transceivers 442 and 444 scan for cell signals on behalf of both SIM-1 472 and SIM-2 474.

Figure 13B:
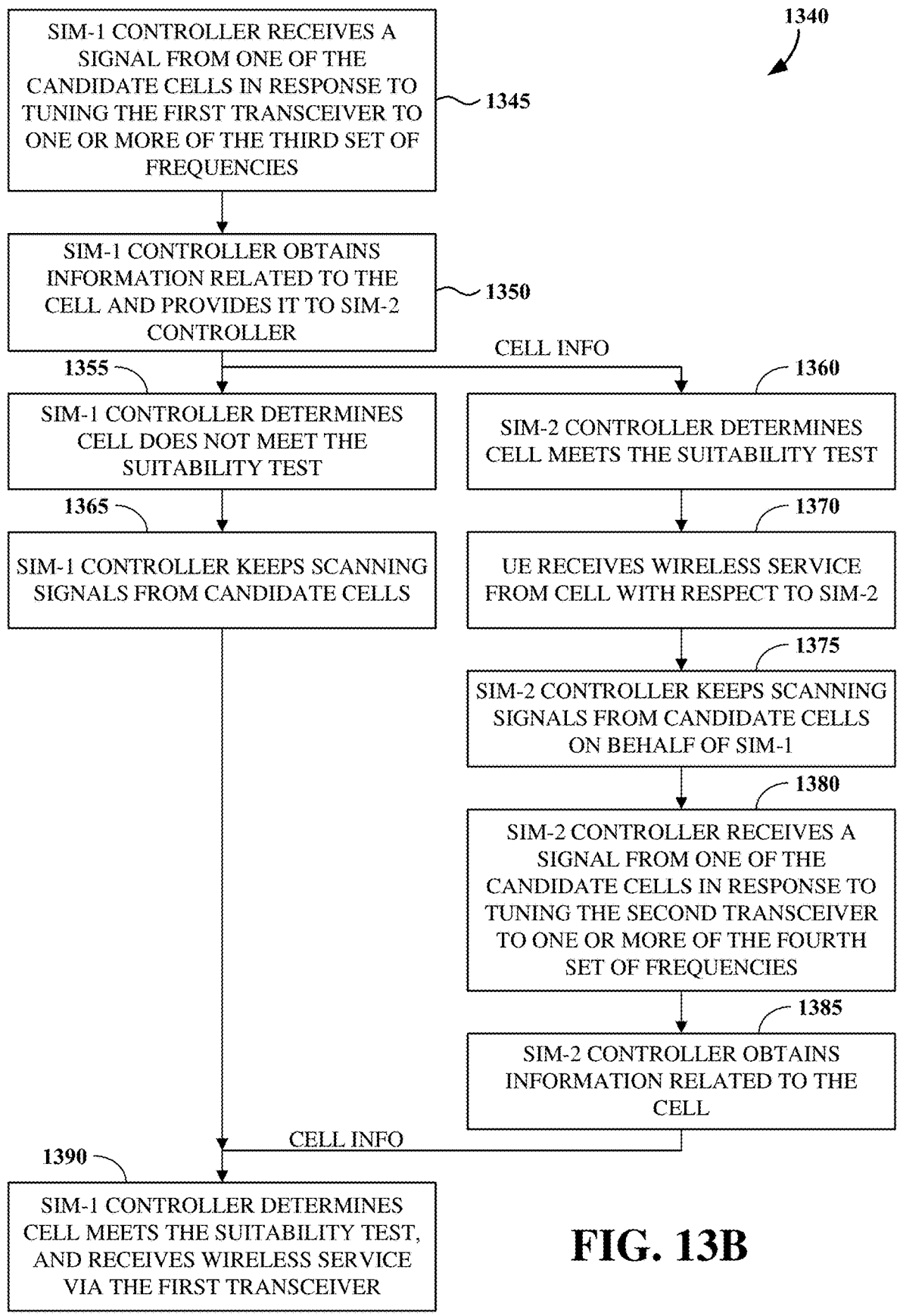
FIG. 13B is a flow diagram of an example method of receiving wireless services with respect to first and second subscriber identity modules (SIMs) based on the cell scanning method of FIG. 13A in accordance with another aspect of the disclosure.

FIG. 13B is a flow diagram of an example method 1340 of receiving wireless services with respect to the first SIM-1 472 and the second SIM-2 474 in accordance with another aspect of the disclosure. The method 1340 may be a continuation of the method 1300 previously discussed. As discussed with reference to method 1300, both SIM-1 and SIM-2 controller 460 are scanning for cell signals on behalf of both SIM-1 472 and SIM-2 474. In the flow diagram of FIG. 13B, the left side represents the SIM-1 controller 460 operations, and the right side represents the SIM-2 controller 460 operations.

In particular, the method 1340 includes the SIM-1 controller 460 receiving a signal from one of the candidate cells 412-1 to 412-M and/or 422-1 to 422-N in response to tuning the first transceiver 442 to one or more of the third set of frequencies (block 1345). The method 1340 further includes the SIM-1 controller 460 obtaining information (e.g., MIB.

SIB, etc.) related to the cell from which the signal was received, and provides the cell information to the SIM-2 controller 460 (block 1350).

In this example, the SIM-1 controller 460 determines that the cell does not meet the suitability test as previously discussed (block 1355). In response, the SIM-1 controller 460 continues to scan for signals from the candidate cells 412-1 to 412-M and/or 422-1 to 422-N (block 1365).

Further, according to this example, the method 1340 includes the SIM-2 controller 460 determining that the cell meets the suitability test (block 1360). The SIM-2 controller 460 then performs the operations for the UE 430 to camp on or receive wireless service from the cell with respect to the second SIM-2 474 (block 1370). The method 1340 further includes the SIM-2 controller 460 continuing to scan for signals from candidate cells 412-1 to 412-M and/or 422-1 to 422-N on behalf of the first SIM-1 472 (block 1375). This may entail the SIM-2 controller 460 performing at least some of the operations of the methods 500, 700, 800, and 1250 previously discussed.

Additionally, per this example, the method 1340 includes the SIM-2 controller 460 receiving a signal from one of the candidate cells 412-1 to 412-M and/or 422-1 to 422-N in response to tuning the second transceiver 444 to one or more of the fourth set of frequencies (block 1380). The method 1340 further includes the SIM-2 controller 460 obtaining information (e.g., MIB, SIB, etc.) related to the cell from which the signal was received, and provides the cell information to the SIM-1 controller 460 as previously discussed (block 1385). Then, according to this example method 1340, the SIM-1 controller 460 determines that the cell meets the suitability test, and camps on or receives wireless service from the cell via the first transceiver 442 (block 1390).

Figure 14:
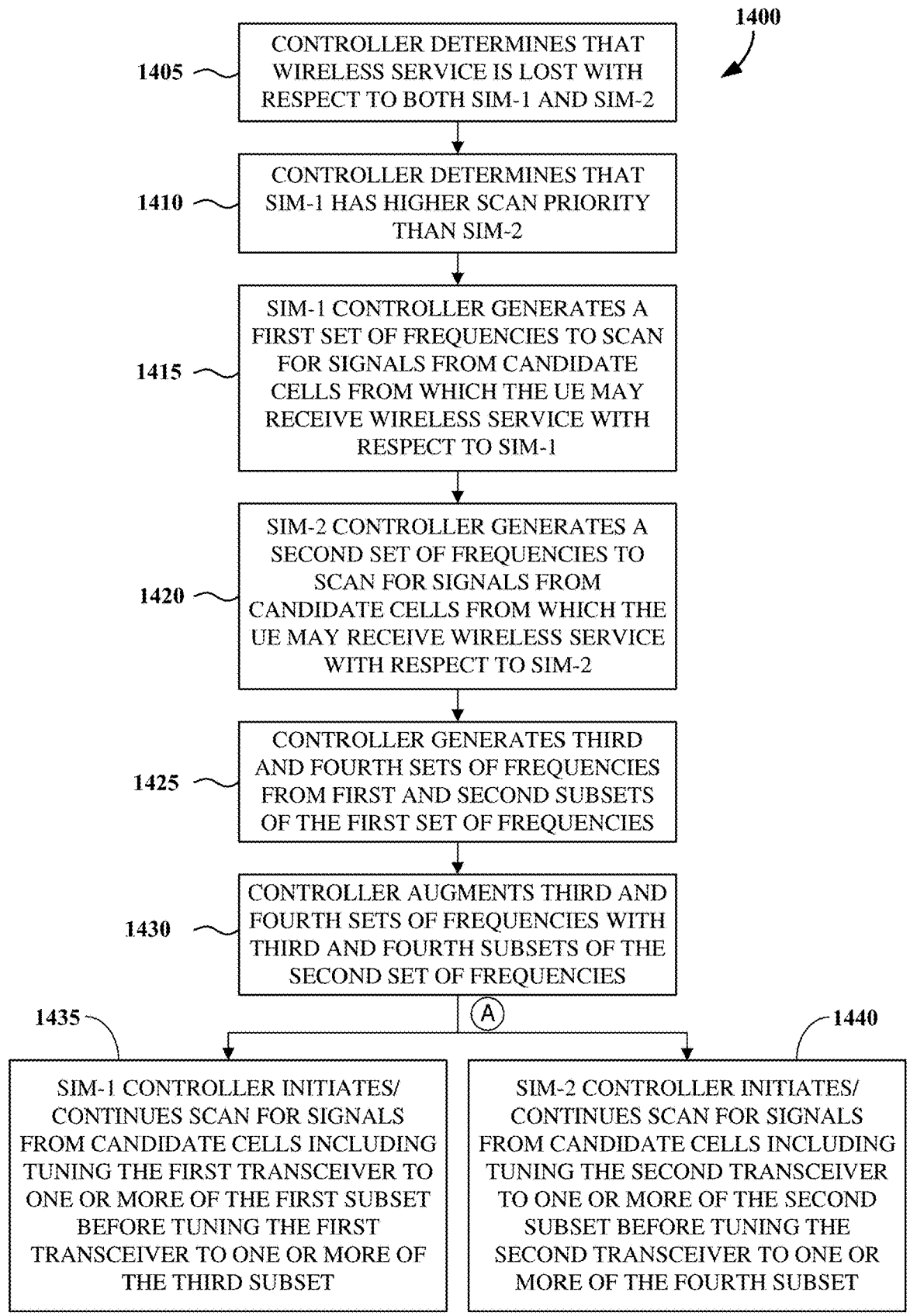
FIG. 14 illustrates a flow diagram of an example method of scanning for cells on behalf of first and second subscriber identity modules (SIMs) by associated transceivers based on a SIM scan priority in accordance with another aspect of the disclosure.

FIG. 14 illustrates a flow diagram of an example method 1400 of scanning for cells on behalf of the first SIM-1 472 and the second SIM-2 474 by transceivers 442 and 444 based on a SIM scan priority in accordance with another aspect of the disclosure. In this example, the first SIM-1 472 has a higher scan priority than the second SIM-2 474. This may be the case where both SIM-1 472 and SIM-2 474 went out-of-service (OOS) at the same time, while SIM-1 472 was in the middle of a voice call, and SIM-2 474 was in idle mode. In this situation. SIM-1 472 is given higher scan priority so that it can quickly recover and resume the voice call. As SIM-2 474 is in idle mode, there is no need for SIM-2 474 to recover faster than SIM-1 472.

More specifically, the method 1400 includes the controller 460 determining that wireless service is lost with respect to both the first SIM-1 472 and the second SIM-2 474 (block 1405). For example, this could mean that the first and second transceivers 442 and 444 are not receiving signals from the selected cells for a certain period such that they have lost signal timing with the cells and are no longer camped on the cells. This may have been the result of signal blockage affecting both transceivers 442 and 444 where the UE 430 has entered a tunnel, elevator, or other Faraday cage type enclosure; signal interference affecting both transceivers 442 and 444; RLFs affecting both transceivers 442 and 444; or other causes.

Then, according to the method 1400, the controller 460 determines that the first SIM-1 472 has higher scan priority than the second SIM-2 474 (block 1410). Then, according to the method 1400, the SIM-1 controller 460 generates a first set of frequencies (first raster) to scan for signals from candidate cells 412-1 to 412-M and/or 422-1 to 422-N from which the UE 430 may receive wireless service with respect to SIM-1 472 (block 1415). The first set of frequencies may have been derived from frequencies used by the first set of cells 412-1 to 412-M and/or the second set of cells 422-1 to 422-N identified in band select and/or acquisition database associated with the core network 410 and/or 420.

Further, according to the method 1400, the SIM-2 controller 460 generates a second set of frequencies (second raster) to scan for signals from candidate cells 412-1 to 412-M and/or 422-1 to 422-N from which the UE 430 may receive wireless service with respect to SIM-2 474 (block 1420). The second set of frequencies may also have been derived from frequencies used by the first set of cells 412-1 to 412-M and/or the second set of cells 422-1 to 422-N identified in band select and/or acquisition database associated with the core network 410 and/or 420.

The method 1400 further includes the controller 460 generating third and fourth sets of frequencies from first and second subsets of the first set of frequencies, respectively (block 1425). The first and second subsets of frequencies pertain to SIM-1 472, which has a higher scan priority. The method 1400 additionally includes the controller 460 augmenting the third and fourth sets of frequencies with third and fourth subsets of the second set of frequencies, respectively (block 1430). The third and fourth subsets of frequencies pertain to SIM-2 474, which has a lower scan priority.

The method 1400 further includes the SIM-1 controller 460 initiating or continuing scanning for signals from candidate cells 412-1 to 412-M and/or 422-1 to 422-N including tuning the first transceiver 442 to one or more of the first subset before tuning the first transceiver 442 to one or more of the third subset (block 1435). As the first subset pertains to SIM-1 472, which has higher scan priority, the first subset of frequencies is scanned before the third subset, which pertains to SIM-2 474, which has lower scan priority.

Concurrently with block 1435, the method 1400 further includes the SIM-2 controller 460 initiating or continuing scanning for signals from candidate cells 412-1 to 412-M and/or 422-1 to 422-N including tuning the second transceiver 444 to one or more of the second subset before tuning the second transceiver 444 to one or more of the fourth subset (block 1440). As the second subset pertains to SIM-1 472, which has higher scan priority, the second subset of frequencies is scanned before the third subset, which pertains to SIM-2 474, which has lower scan priority.

As both SIM-1 and SIM-2 controller 460 are searching for cells on behalf of each other and in a non-overlapping frequency manner, the recovery time from an OOS situation with respect to both SIM-1 472 and SIM-474 may be significantly reduced. Further, as the first and second sets of frequencies may be generated such that the sets have non-overlapping frequencies, the power consumption should not increase by having both transceivers 442 and 444 scan for cell signals on behalf of both SIM-1 472 and SIM-2 474.

Figure 15:
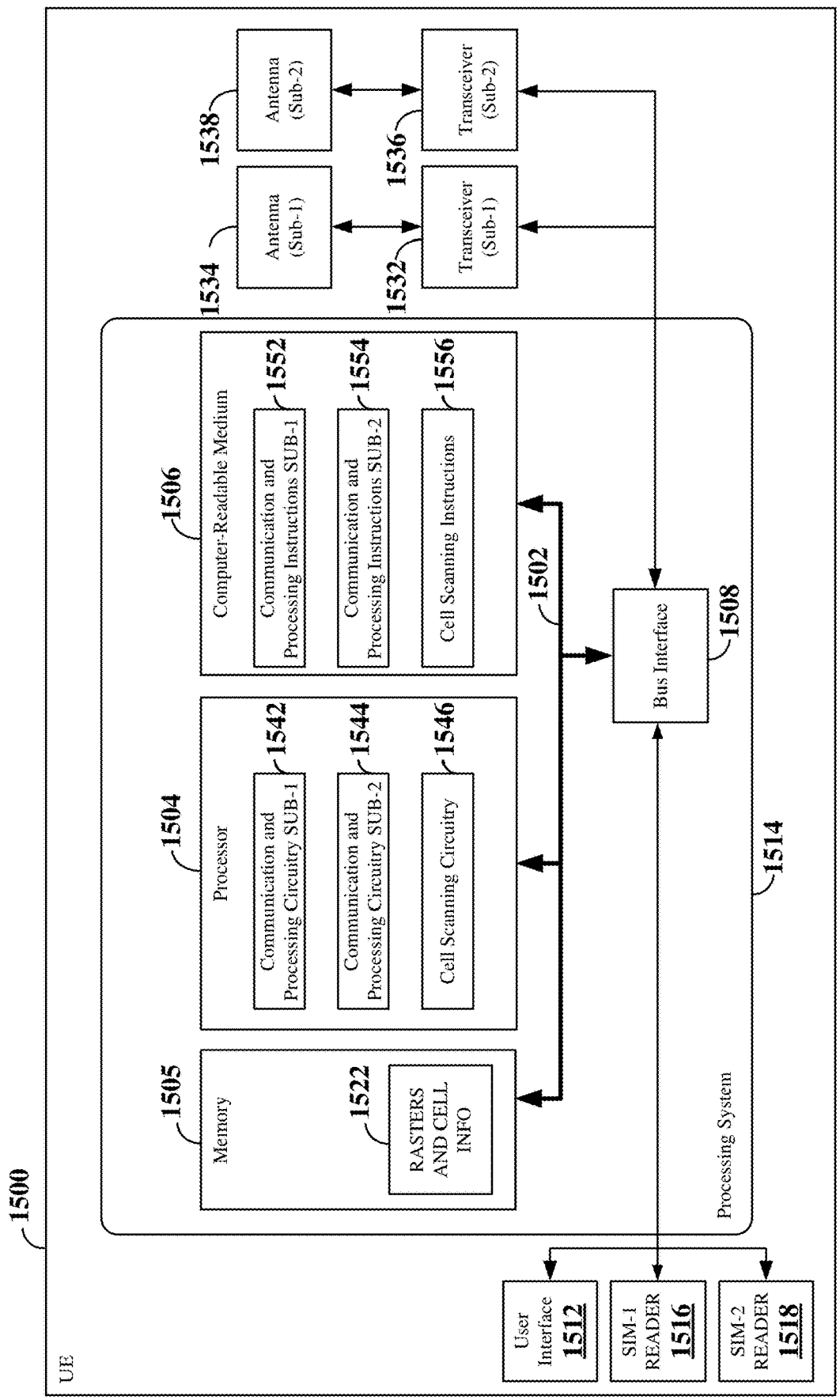
FIG. 15 is a block diagram illustrating an example of a hardware implementation for user equipment (UE) employing a processing system in accordance with another aspect of the disclosure.

FIG. 15 is a block diagram illustrating an example of a hardware implementation for a user equipment (UE) 1500 employing a processing system 1514. For example, the UE 1500 may correspond to any of the UEs described above with reference to FIGS. 1, 2, and 4.

The UE 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in the UE 1500, may be used to implement any one or more of the processes and procedures described below.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further.

A bus interface 1508 provides an interface between the bus 1502 and a first transceiver 1532 coupled to at least one antenna 1534 (e.g., an antenna array or one or more antenna panels) associated with a first SIM-1 card. The bus interface 1508 also provides an interface between the bus 1502 and a second transceiver 1536 coupled to another at least one antenna 1538 (e.g., an antenna array or one or more antenna panels) associated with a second SIM-2 card. The transceivers 1532 and 1536 provide a means for communicating with various other apparatus over a transmission medium (e.g., air interface). Depending upon the nature of the apparatus, a user interface 1512 (e.g., keypad, display, touch screen, speaker, microphone, control knobs, etc.) may also be coupled to the bus interface 1508. Of course, such a user interface 1512 is optional, and may be omitted in some examples. Additionally, the UE 1500 may include SIM card readers, such as SIM-1 reader 1516 for reading information from a first SIM-1 card and SIM-2 reader 1518 for reading information from a second SIM-2 card, both coupled to the bus interface 1508.

The processor 1504 is responsible for managing the bus 1502 and general processing, including the execution of software stored on the computer-readable medium 1506. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1504, causes the processing system 1514 to perform the various functions as described herein. The computer-readable medium 1506 and the memory 1505 may also be used for storing data that is manipulated by the processor 1504 when executing software. For example, the memory 1505 may store cell configuration information including frequency information. Such as information may have been received via MIBs and SIBs (e.g., SIB1, SIB3, SIBS, and/or SIB6), from cells previously camped on or previously obtained the SIB information including the p-Max parameters.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. In some examples, the computer-readable medium 1506 may be part of the memory 1505. Those skilled in the art will recognize how best to implement the described functionality presented throughout this disclosure depending on the particular application and the overall design constraints imposed on the overall system.

In some aspects of the disclosure, the processor 1504 may include circuitry configured for various functions. For example, the processor 1504 may include a communication and processing circuitry SUB-1 1542 configured to communicate with cells or base stations, such as a gNB, in accordance with information in a first SIM-1 card read by the first SIM-1 card reader 1516. The communication and processing circuitry SUB-1 1542 may perform the corresponding operations discussed with reference to methods 600, 650, and 1340. The communication and processing circuitry SUB-1 1542 may perform its operations under the control of communication and processing instructions SUB-1 1552 stored in the computer-readable medium 1506. In some examples, the communication and processing circuitry SUB-1 1542 may include one or more hardware components that provide the physical structure that performs processes related to wireless communication (e.g., signal reception and/or signal transmission) and signal processing (e.g., processing a received signal and/or processing a signal for transmission).

The processor 1504 may include a communication and processing circuitry 1544, configured to communicate with cells or base stations, such as a gNB, in accordance with information in a second SIM-2 card read by the second SIM-2 card reader 1518. The communication and processing circuitry SUB-2 1544 may perform the corresponding operations discussed with reference to methods 600, 650, and 1340. The communication and processing circuitry SUB-2 1544 may perform its operations under the control of communication and processing instructions SUB-2 1554 stored in the computer-readable medium 1506. In some examples, the communication and processing circuitry SUB-2 1544 may include one or more hardware components that provide the physical structure that performs processes related to wireless communication (e.g., signal reception and/or signal transmission) and signal processing (e.g., processing a received signal and/or processing a signal for transmission).

The processor 1504 may include a cell scanning circuitry 1546 to control searching for cell signals on behalf of the first SIM-1, the second SIM-2, or both the first and second SIMs-1 and -2, as previously discussed with methods 500, 700, 800, 1100, 1250, 1300, and 1400. The cell scanning circuitry 1546 may perform its operations under the cell scanning instructions 1556 stored in the computer-readable medium 1506.

Figure 16:
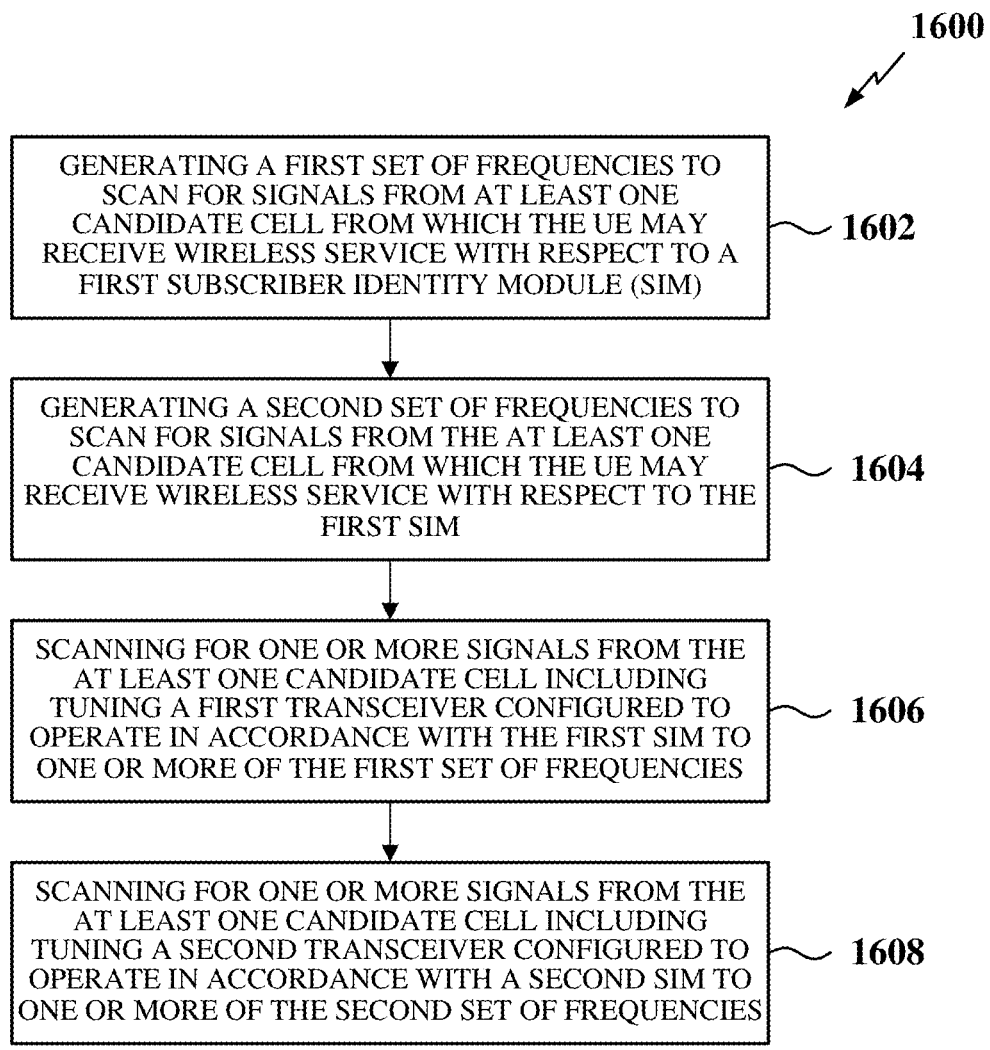
FIG. 16 is a flow chart illustrating an example method of method of scanning for cells on behalf of a first subscriber identity module (SIM) by transceivers configured to operate in accordance with the first and second SIMs in accordance with another aspect of the disclosure.

FIG. 16 is a flow charts illustrating an exemplary method 1600 of scanning for signals from candidate cells in accordance with another aspect of the disclosure. According to the method 1600, the cell scanning circuitry 1546 generates a first set of frequencies to scan for signals from at least one candidate cell from which the UE 1500 may receive wireless service with respect to the SIM-1 in reader 1516 (block 1602). The method 1600 further includes the cell scanning circuitry 1546 generating a second set of frequencies to scan for signals from the at least one candidate cell from which the UE 1500 may receive wireless service with respect to the SIM-1 in reader 1516 (block 1604).

The method 1600 further includes the communications and processing circuitry SUB-1 1542 scanning for one or more signals from the at least one candidate cell including tuning the first transceiver 1532 configured to operate in accordance with the SIM-1 in reader 1516 to one or more of the first set frequencies (block 1606). Additionally, the method 1600 includes the communications and processing circuitry SUB-2 1544 scanning for one or more signals from the at least one candidate cell including tuning the second transceiver 1536 configured to operate in accordance with the SIM-2 in reader 1518 to one or more of the second set frequencies (block 1608).

In one configuration, the UE 1500 includes various means as described in the present disclosure. In one aspect, the aforementioned means may be the processor 1504 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one of the FIGS. 1, 2, and 4 utilizing, for example, the processes and/or algorithms described herein in relation to FIG. 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The following provides an overview of aspects of the present disclosure:

Aspect 1: A method of wireless communication at a user equipment (UE), comprising: generating a first set of frequencies to scan for signals from at least one candidate cell from which the UE may receive wireless service with respect to a first subscriber identity module (SIM); generating a second set of frequencies to scan for signals from the at least one candidate cell from which the UE may receive wireless service with respect to the first SIM; scanning for one or more signals from the at least one candidate cell including tuning a first transceiver configured to operate in accordance with the first SIM to one or more of the first set of frequencies; and scanning for one or more signals from the at least one candidate cell including tuning a second transceiver configured to operate in accordance with a second SIM to one or more of the second set of frequencies.

Aspect 2: The method of aspect 1, wherein the first and second sets of frequencies have non-overlapping frequencies.

Aspect 3: The method of aspect 1 or 2, wherein generating the first and second sets of frequencies is in response to the first transceiver losing wireless service from a cell.

Aspect 4: The method of any one of aspects 1-3, wherein generating the first and second sets of frequencies is in response to a radio link failure associated with the first transceiver.

Aspect 5: The method of any one of aspects 1-4, further comprising: receiving a signal from a cell in response to tuning the second transceiver to the one or more of the second set of frequencies; and obtaining wireless services from the cell via the first transceiver.

Aspect 6: The method of any one of aspects 1-4, further comprising: receiving a signal from a cell in response to tuning the first transceiver to the one or more of the first set of frequencies; and obtaining wireless services from the cell via the first transceiver.

Aspect 7: The method of any one of aspects 1-6, while the UE is in idle mode operating in accordance with the second SIM, the scanning for one or more signals from the at least one candidate cell using the second transceiver occurs between paging occasions or measurements of one or more signals from the at least one candidate cell to receive wireless service via the second transceiver.

Aspect 8: The method of any one of aspects 1-6, while the UE is in connected mode with respect to the second SIM, the scanning for one or more signals from the at least one candidate cell using the second transceiver occurs between separate decoding of a physical downlink control channel (PDCCH) or a physical downlink shared channel (PDSCH).

Aspect 9: The method of aspect 8, while the UE is in connected mode with respect to the second SIM, further comprising: determining a time interval between separate decoding of the PDCCH or PDSCH is insufficient to perform the scanning for one or more signals from the at least one candidate cell using the second transceiver; sending a request to a network via the second transceiver to increase the time interval between separate decoding of the PDCCH or PDSCH; receiving an approval of the request from the network via the second transceiver for the increased time interval; and scanning for one or more signals from the at least one candidate cell using the second transceiver during the increased time interval.

Aspect 10: The method of any one of aspects 1-9, wherein generating the first and second sets of frequencies comprises: determining a third set of frequencies to scan for one or more signals from the at least one candidate cell from which the UE may receive wireless service via the first transceiver; and dividing the third set of frequencies into a first subset of one or more frequencies and a second subset of one or more frequencies, wherein the first set of frequencies comprises the first subset of one or more frequencies, and wherein the second set of frequencies comprises the second subset of one or more frequencies.

Aspect 11: The method of aspect 10, wherein generating the first and second sets of frequencies further comprises: determining a fourth set of frequencies to search for one or more signals from the at least one candidate cell from which the UE may receive wireless service via the first transceiver, the fourth set of frequencies having less scan priority than the third set of frequencies; and dividing the fourth set of frequencies into a third subset of one or more frequencies and a fourth subset of one or more frequencies, wherein the first set of frequencies comprises the third subset of one or more frequencies, and wherein the second set of frequencies comprises the fourth subset of one or more frequencies.

Aspect 12: The method of aspect 11, wherein: scanning for one or more signals from the at least one candidate cell using the first transceiver comprises tuning the first transceiver to one or more frequencies of the first subset before tuning the first transceiver to one or more frequencies of the third subset; and scanning for one or more signals from the at least one candidate cell using the second transceiver comprises tuning the second transceiver to one or more frequencies of the second subset before tuning the second transceiver to one or more frequencies of the fourth subset.

Aspect 13: The method of any one of aspects 1-12, wherein generating the first and second sets of frequencies is in response to loss of wireless service via the first and second transceivers.

Aspect 14: The method of aspect 13, further comprising receiving a signal from a cell in response to tuning the first transceiver to one or more of the first set of frequencies.

Aspect 15: The method of aspect 14, further comprising receiving wireless service from the cell via the first transceiver.

Aspect 16: The method of aspect 14, further comprising receiving wireless service from the cell via the second transceiver.

Aspect 17: The method of any one of aspects 13-16, wherein generating the first and second sets is based on determining that the UE operating in accordance with the first SIM has wireless service priority over the UE operating in accordance with the second SIM.

Aspect 18: A user equipment (UE) within a wireless communication network, comprising: a first transceiver; a second transceiver; a memory; and a processor communicatively coupled to the first and second transceivers and the memory, wherein the processor and the memory are configured to: generate a first set of frequencies to scan for signals from at least one candidate cell from which the UE may receive wireless service with respect to a first subscriber identity module (SIM); generate a second set of frequencies to scan for signals from the at least one candidate cell from which the UE may receive wireless service with respect to the first SIM; scan for one or more signals from the at least one candidate cell including tuning the first transceiver configured to operate in accordance with the first SIM to one or more of the first set of frequencies; and scan for one or more signals from the at least one candidate cell including tuning the second transceiver configured to operate in accordance with a second SIM to one or more of the second set of frequencies.

Aspect 19: The UE of aspect 18, wherein the processor and the memory are configured to generate the first and second sets of frequencies in response to the first transceiver losing wireless service from a cell.

Aspect 20: The UE of aspect 18 or 19, wherein the processor and the memory are configured to: receive a signal from a cell in response to tuning the second transceiver to the one or more of the second set of frequencies; and obtain wireless service from the cell via the first transceiver.

Aspect 21: The UE of aspect 18 or 19, wherein the processor and the memory are configured to: receive a signal from a cell in response to tuning the first transceiver to the one or more of the first set of frequencies; and obtain wireless service from the cell via the first transceiver.

Aspect 22: The UE of any one of aspects 18-21, while the UE is in idle mode operating in accordance with the second SIM, the processor and the memory are configured to scan for one or more signals from the at least one candidate cell using the second transceiver between paging occasions or measurements of one or more signals from at least one candidate cell from which the UE may wireless service with respect to the second SIM.

Aspect 23: The UE of any one of aspects 18-21, while the UE is in connected mode with respect to the second SIM, the processor and the memory are configured to scan for one or more signals from the at least one candidate cell using the second transceiver between separate decoding of a physical downlink control channel (PDCCH) or a physical downlink shared channel (PDSCH) with respect to the second SIM.

Aspect 24: The UE of any one of aspect 18-23, wherein the processor and the memory are configured to generate the first and second sets of frequencies based on a scan priority of frequencies.

Aspect 25: The UE of any one of aspects 18-24, wherein the processor and the memory are configured to generate the first and second sets of frequencies in response to loss of wireless service via the first and second transceivers.

Aspect 26: The UE of aspect 25, wherein the processor and the memory are further configured to: receive a signal from a cell in response to tuning the first transceiver to one or more of first set of frequencies or the second transceiver to one or more of the second set of frequencies; and receive wireless service from the cell via the first transceiver.

Aspect 27: The UE of aspect 25 or 26, wherein the processor and the memory are further configured to receive wireless service from the cell via the second transceiver.

Aspect 28: The UE of any one of aspects 25-27, wherein the processor and the memory are configured to generate the first and second sets of frequencies based on determining that the UE operating in accordance with the first SIM has wireless service priority over the UE operating in accordance with the second SIM.

Aspect 29: A user equipment (UE) within a wireless communication network, comprising: means for generating a first set of frequencies to scan for signals from at least one candidate cell from which the UE may receive wireless service with respect to a first subscriber identity module (SIM); means for generating a second set of frequencies to scan for signals from the at least one candidate cell from which the UE may receive wireless service with respect to the first SIM; means for scanning for one or more signals from the at least one candidate cell including means for tuning a first transceiver configured to operate in accordance with the first SIM to one or more of the first set of frequencies; and means for scanning for one or more signals from the at least one candidate cell including means for tuning a second transceiver configured to operate in accordance with a second SIM to one or more of the second set of frequencies.

Aspect 30: A non-transitory computer-readable medium storing computer-executable code, comprising code for causing a computer in a user equipment (UE) to: generate a first set of frequencies to scan for signals from at least one candidate cell from which the UE may receive wireless service with respect to a first subscriber identity module (SIM); generate a second set of frequencies to scan for signals from the at least one candidate cell from which the UE may receive wireless service with respect to the first SIM; scan for one or more signals from the at least one candidate cell including tuning a first transceiver configured to operate in accordance with the first SIM to one or more of the first set of frequencies; and scan for one or more signals from the at least one candidate cell including tuning a second transceiver configured to operate in accordance with a second SIM to one or more of the second set of frequencies.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of wireless communication at a user equipment (UE), comprising:
   generating a first set of frequencies to scan for signals from at least one candidate cell from which the UE may receive wireless service with respect to a first subscriber identity module (SIM);
   generating a second set of frequencies to scan for signals from the at least one candidate cell from which the UE may receive wireless service with respect to the first SIM;
   scanning for one or more signals from the at least one candidate cell including tuning a first transceiver configured to operate in accordance with the first SIM to one or more of the first set of frequencies; and
   scanning for one or more signals from the at least one candidate cell including tuning a second transceiver configured to operate in accordance with a second SIM to one or more of the second set of frequencies;
   while the UE is in connected mode with respect to the second SIM, the scanning for one or more signals from the at least one candidate cell using the second transceiver occurs between separate decoding of a physical downlink control channel (PDCCH) or a physical downlink shared channel (PDSCH) with respect to the second SIM, and further comprising:
   determining a time interval between separate decoding of the PDCCH or PDSCH is insufficient to perform the scanning for one or more signals from the at least one candidate cell using the second transceiver;
   sending a request to a network via the second transceiver to increase the time interval between separate decoding of the PDCCH or PDSCH;
   receiving an approval of the request from the network via the second transceiver for the increased time interval; and
   scanning for one or more signals from the at least one candidate cell using the second transceiver during the increased time interval.

2. The method of claim 1, wherein the first and second sets of frequencies have non-overlapping frequencies.

3. The method of claim 1, wherein generating the first and second sets of frequencies is in response to the first transceiver losing wireless service from a cell.

4. The method of claim 1, wherein generating the first and second sets of frequencies is in response to a radio link failure associated with the first transceiver.

5. The method of claim 1, further comprising:
receiving a signal from a cell in response to tuning the second transceiver to the one or more of the second set of frequencies; and
obtaining wireless service from the cell via the first transceiver.

6. The method of claim 1, further comprising:
receiving a signal from a cell in response to tuning the first transceiver to the one or more of the first set of frequencies; and
obtaining wireless service from the cell via the first transceiver.

7. The method of claim 1, while the UE is in idle mode operating in accordance with the second SIM, the scanning for one or more signals from the at least one candidate cell using the second transceiver occurs between paging occasions or measurements of one or more signals from at least one candidate cell from which the UE may receive wireless service with respect to the second SIM.

8. The method of claim 1, wherein generating the first and second sets of frequencies is in response to loss of wireless service via the first and second transceivers.

9. The method of claim 8, further comprising receiving a signal from a cell in response to tuning the first transceiver to one or more of the first set of frequencies.

10. The method of claim 9, further comprising receiving wireless service from the cell via the first transceiver.

11. The method of claim 9, further comprising receiving wireless service from the cell via the second transceiver.

12. The method of claim 8, wherein generating the first and second sets of frequencies is based on determining that the UE operating in accordance with the first SIM has wireless service priority over the UE operating in accordance with the second SIM.

13. A method of wireless communication at a user equipment (UE), comprising:
generating a first set of frequencies to scan for signals from at least one candidate cell from which the UE may receive wireless service with respect to a first subscriber identity module (SIM);
generating a second set of frequencies to scan for signals from the at least one candidate cell from which the UE may receive wireless service with respect to the first SIM;
scanning for one or more signals from the at least one candidate cell including tuning a first transceiver configured to operate in accordance with the first SIM to one or more of the first set of frequencies; and
scanning for one or more signals from the at least one candidate cell including tuning a second transceiver configured to operate in accordance with a second SIM to one or more of the second set of frequencies;
wherein generating the first and second sets of frequencies comprises:
determining a third set of frequencies to scan for one or more signals from the at least one candidate cell from which the UE may receive wireless service via the first transceiver; and
dividing the third set of frequencies into a first subset of one or more frequencies and a second subset of one or more frequencies, wherein the first set of frequencies comprises the first subset of one or more frequencies, and wherein the second set of frequencies comprises the second subset of one or more frequencies;
wherein generating the first and second sets of frequencies further comprises:
determining a fourth set of frequencies to scan for one or more signals from the at least one candidate cell from which the UE may receive wireless service via the first transceiver, the fourth set of frequencies having less scan priority than the third set of frequencies; and
dividing the fourth set of frequencies into a third subset of one or more frequencies and a fourth subset of one or more frequencies, wherein the first set of frequencies comprises the third subset of one or more frequencies, and wherein the second set of frequencies comprises the fourth subset of one or more frequencies.

14. The method of claim 13, wherein:
scanning for one or more signals from the at least one candidate cell using the first transceiver comprises tuning the first transceiver to one or more frequencies of the first subset before tuning the first transceiver to one or more frequencies of the third subset; and
scanning for one or more signals from the at least one candidate cell using the second transceiver comprises tuning the second transceiver to one or more frequencies of the second subset before tuning the second transceiver to one or more frequencies of the fourth subset.

15. A user equipment (UE) within a wireless communication network, comprising:
a first transceiver;
a second transceiver;
a memory; and
a processor communicatively coupled to the first and second transceivers and the memory, wherein the processor and the memory are configured to:
generate a first set of frequencies to scan for signals from at least one candidate cell from which the UE may receive wireless service with respect to a first subscriber identity module (SIM);
generate a second set of frequencies to scan for signals from the at least one candidate cell from which the UE may receive wireless service with respect to the first SIM;
scan for one or more signals from the at least one candidate cell including tuning the first transceiver configured to operate in accordance with the first SIM to one or more of the first set of frequencies; and
scan for one or more signals from the at least one candidate cell including tuning the second transceiver configured to operate in accordance with a second SIM to one or more of the second set of frequencies;
while the UE is in connected mode with respect to the second SIM, the processor and the memory are configured to scan for one or more signals from the at least one candidate cell using the second transceiver between separate decoding of a physical downlink control channel (PDCCH) or a physical downlink shared channel (PDSCH) with respect to the second SIM;
wherein the processor and memory are further configured to:
determine a time interval between separate decoding of the PDCCH or PDSCH is insufficient to perform the scanning for one or more signals from the at least one candidate cell using the second transceiver;

send a request to a network via the second transceiver to increase the time interval between separate decoding of the PDCCH or PDSCH;

receive an approval of the request from the network via the second transceiver for the increased time interval; and scan for one or more signals from the at least one candidate cell using the second transceiver during the increased time interval.

16. The UE of claim 15, wherein the processor and the memory are configured to generate the first and second sets of frequencies in response to the first transceiver losing wireless service from a cell.

17. The UE of claim 15, wherein the processor and the memory are configured to:
receive a signal from a cell in response to tuning the second transceiver to the one or more of the second set of frequencies; and
obtain wireless service from the cell via the first transceiver.

18. The UE of claim 15, wherein the processor and the memory are configured to:
receive a signal from a cell in response to tuning the first transceiver to the one or more of the first set of frequencies; and
obtain wireless service from the cell via the first transceiver.

19. The UE of claim 15, while the UE is in idle mode operating in accordance with the second SIM, the processor and the memory are configured to scan for one or more signals from the at least one candidate cell using the second transceiver between paging occasions or measurements of one or more signals from at least one candidate cell from which the UE may wireless service with respect to the second SIM.

20. The UE of claim 15, wherein the processor and the memory are configured to generate the first and second sets of frequencies based on a scan frequency priority.

21. The UE of claim 15, wherein the processor and the memory are configured to generate the first and second sets of frequencies in response to loss of wireless service via the first and second transceivers.

22. The UE of claim 21, wherein the processor and the memory are further configured to:
receive a signal from a cell in response to tuning the first transceiver to one or more of first set of frequencies or the second transceiver to one or more of the second set of frequencies; and
receive wireless service from the cell via the first transceiver.

23. The UE of claim 22, wherein the processor and the memory are further configured to receive wireless service from the cell via the second transceiver.

24. The UE of claim 21, wherein the processor and the memory are configured to generate the first and second sets of frequencies based on determining that the UE operating in accordance with the first SIM has wireless service priority over the UE operating in accordance with the second SIM.

25. A user equipment (UE) within a wireless communication network, comprising:
means for generating a first set of frequencies to scan for signals from at least one candidate cell from which the UE may receive wireless service with respect to a first subscriber identity module (SIM);

means for generating a second set of frequencies to scan for signals from the at least one candidate cell from which the UE may receive wireless service with respect to the first SIM;

means for scanning for one or more signals from the at least one candidate cell including means for tuning a first transceiver configured to operate in accordance with the first SIM to one or more of the first set of frequencies; and means for scanning for one or more signals from the at least one candidate cell including means for tuning a second transceiver configured to operate in accordance with a second SIM to one or more of the second set of frequencies;

while the UE is in connected mode with respect to the second SIM, the means for scanning for one or more signals from the at least one candidate cell using the second transceiver includes means for scanning between separate decoding of a physical downlink control channel (PDCCH) or a physical downlink shared channel (PDSCH) with respect to the second SIM, and further comprising:
means for determining a time interval between separate decoding of the PDCCH or PDSCH is insufficient to perform the scanning for one or more signals from the at least one candidate cell using the second transceiver;
means for sending a request to a network via the second transceiver to increase the time interval between separate decoding of the PDCCH or PDSCH;
means for receiving an approval of the request from the network via the second transceiver for the increased time interval; and
means for scanning for one or more signals from the at least one candidate cell using the second transceiver during the increased time interval.

26. A non-transitory computer-readable medium storing computer-executable code, comprising code for causing a computer in a user equipment (UE) to:
generate a first set of frequencies to scan for signals from at least one candidate cell from which the UE may receive wireless service with respect to a first subscriber identity module (SIM);

generate a second set of frequencies to scan for signals from the at least one candidate cell from which the UE may receive wireless service with respect to the first SIM;

scan for one or more signals from the at least one candidate cell including tuning a first transceiver configured to operate in accordance with the first SIM to one or more of the first set of frequencies; and scan for one or more signals from the at least one candidate cell including tuning a second transceiver configured to operate in accordance with a second SIM to one or more of the second set of frequencies;

while the UE is in connected mode with respect to the second SIM, the scan for one or more signals from the at least one candidate cell using the second transceiver occurs between separate decoding of a physical downlink control channel (PDCCH) or a physical downlink shared channel (PDSCH) with respect to the second SIM, wherein the code is further for causing the computer in the user equipment (UE) to:
determine a time interval between separate decoding of the PDCCH or PDSCH is insufficient to perform the scanning for one or more signals from the at least one candidate cell using the second transceiver;

send a request to a network via the second transceiver to increase the time interval between separate decoding of the PDCCH or PDSCH;

receive an approval of the request from the network via the second transceiver for the increased time interval; and scan for one or more signals from the at least one candidate cell using the second transceiver during the increased time interval.

\* \* \* \* \*